United States Patent
Yun et al.

(10) Patent No.: US 12,114,086 B2
(45) Date of Patent: Oct. 8, 2024

(54) IMAGE SENSOR AND ELECTRONIC DEVICE INCLUDING THE SAME

(71) Applicant: SAMSUNG ELECTRONICS CO., LTD., Suwon-si (KR)

(72) Inventors: Jung Bin Yun, Hwaseong-si (KR); Kyungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/454,395

(22) Filed: Nov. 10, 2021

(65) Prior Publication Data

US 2022/0247949 A1  Aug. 4, 2022

(30) Foreign Application Priority Data

Feb. 1, 2021 (KR) .................. 10-2021-0014244

(51) Int. Cl.
| | |
|---|---|
| *H04N 5/232* | (2006.01) |
| *H04N 25/44* | (2023.01) |
| *H04N 25/704* | (2023.01) |
| *H04N 25/766* | (2023.01) |
| *H04N 25/778* | (2023.01) |

(52) U.S. Cl.
CPC ........... *H04N 25/704* (2023.01); *H04N 25/44* (2023.01); *H04N 25/766* (2023.01); *H04N 25/778* (2023.01)

(58) Field of Classification Search
None
See application file for complete search history.

(56) References Cited

U.S. PATENT DOCUMENTS

| | | | |
|---|---|---|---|
| 10,211,245 B2 | 2/2019 | Kim et al. | |
| 10,412,349 B2 | 9/2019 | Hwang et al. | |
| 10,594,970 B2 | 3/2020 | Sato et al. | |
| 2007/0127138 A1* | 6/2007 | Nakahara | H04N 23/673 |
| | | | 359/694 |
| 2013/0341750 A1* | 12/2013 | Ichikawa | H04N 25/778 |
| | | | 257/440 |
| 2015/0163440 A1* | 6/2015 | Furumochi | H04N 23/63 |
| | | | 348/240.99 |
| 2016/0173793 A1* | 6/2016 | Mitsunaga | H04N 25/583 |
| | | | 348/229.1 |

(Continued)

FOREIGN PATENT DOCUMENTS

JP  2016092594  5/2016

*Primary Examiner* — Twyler L Haskins
*Assistant Examiner* — Wesley J Chiu
(74) *Attorney, Agent, or Firm* — F. Chau & Associates, LLC

(57) ABSTRACT

An electronic device includes an image sensor that generates image data, and an image processor that processes the image data. The image sensor includes a pixel array including pixels repeatedly disposed along a row direction and a column direction. Each of pixels belonging to a first row of rows of the pixel array includes sub-pixels each connected to one of a first transmission metal line, a second transmission metal line, and a third transmission metal line. In response to signals respectively applied to the first to third transmission metal lines, at least a part of charges integrated at the sub-pixels of the pixels belonging to the first row from among the pixels is diffused to corresponding floating diffusion areas.

7 Claims, 14 Drawing Sheets

(56) References Cited

U.S. PATENT DOCUMENTS

| | | | |
|---|---|---|---|
| 2017/0041525 A1* | 2/2017 | Liu | H04N 23/672 |
| 2017/0064202 A1* | 3/2017 | Ajito | H04N 25/48 |
| 2018/0063456 A1* | 3/2018 | Lee | H04N 25/76 |
| 2018/0261644 A9* | 9/2018 | Kato | H01L 27/14612 |
| 2019/0019835 A1 | 1/2019 | Tanaka et al. | |
| 2019/0104261 A1* | 4/2019 | Hatakeyama | H04N 25/778 |
| 2020/0106995 A1* | 4/2020 | Ramaswami | H01L 27/14645 |
| 2020/0161352 A1* | 5/2020 | Takahashi | H01L 27/14641 |
| 2022/0272292 A1* | 8/2022 | Yamajo | H04N 23/12 |

\* cited by examiner

IMAGE SENSOR AND ELECTRONIC DEVICE INCLUDING THE SAME

CROSS-REFERENCE TO RELATED APPLICATIONS

This application claims priority under 35 U.S.C. § 119 to Korean Patent Application No. 10-2021-0014244, filed on Feb. 1, 2021 in the Korean Intellectual Property Office, the disclosure of which is incorporated by reference herein in its entirety.

TECHNICAL FIELD

Embodiments of the present disclosure relate to an image sensor and an electronic device including the same, and more particularly, to an image sensor supporting an autofocus function and an electronic device including the same.

DISCUSSION OF RELATED ART

An image sensor may be mounted in various types of electronic devices. For example, an electronic device that includes an image sensor may be implemented with one of various types of electronic devices such as a smartphone, a tablet personal computer (PC), a laptop PC, and a wearable device.

The image sensor obtains image information about an external object by converting light reflected from the external object into an electrical signal. An electronic device including the image sensor may display an image in a display panel by using the obtained image information.

An autofocus (AF) function may be used to increase the quality of an image of the external object. To perform the autofocus function more quickly, an image sensor may be used which supports phase detection autofocus (PDAF).

SUMMARY

Embodiments of the present disclosure provide an image sensor capable of supporting phase detection autofocus and improving the performance of autofocus thereof, and an electronic device including the same.

According to an embodiment, an electronic device may include an image sensor that generates image data, and an image processor that processes the image data. The image sensor may include a pixel array including pixels repeatedly disposed along a row direction and a column direction. Each of pixels belonging to a first row of rows of the pixel array may include sub-pixels each connected to one of a first transmission metal line, a second transmission metal line, and a third transmission metal line. In response to signals respectively applied to the first to third transmission metal lines, at least a part of charges integrated at the sub-pixels of the pixels belonging to the first row from among the pixels may be diffused to corresponding floating diffusion areas.

According to an embodiment, an image sensor may include a pixel array. The pixel array may include a first pixel group including pixels that generate image data. A first row of the first pixel group may include a first pixel including a pair of sub-pixels each receiving one of a first transfer gate signal and a second transfer gate signal, and a second pixel including a pair of sub-pixels each receiving one of the second transfer gate signal and a third transfer gate signal.

According to an embodiment, an image sensor may include a pixel array. The pixel array may include a first pixel group including a first unit pixel group, a second unit pixel group, a third unit pixel group, and a fourth unit pixel group. The first pixel group may include a first pixel including a pair of sub-pixels each receiving one of a first transfer gate signal and a second transfer gate signal, and a second pixel including a pair of sub-pixels each receiving one of the first transfer gate signal and the second transfer gate signal, and a third transfer gate signal.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
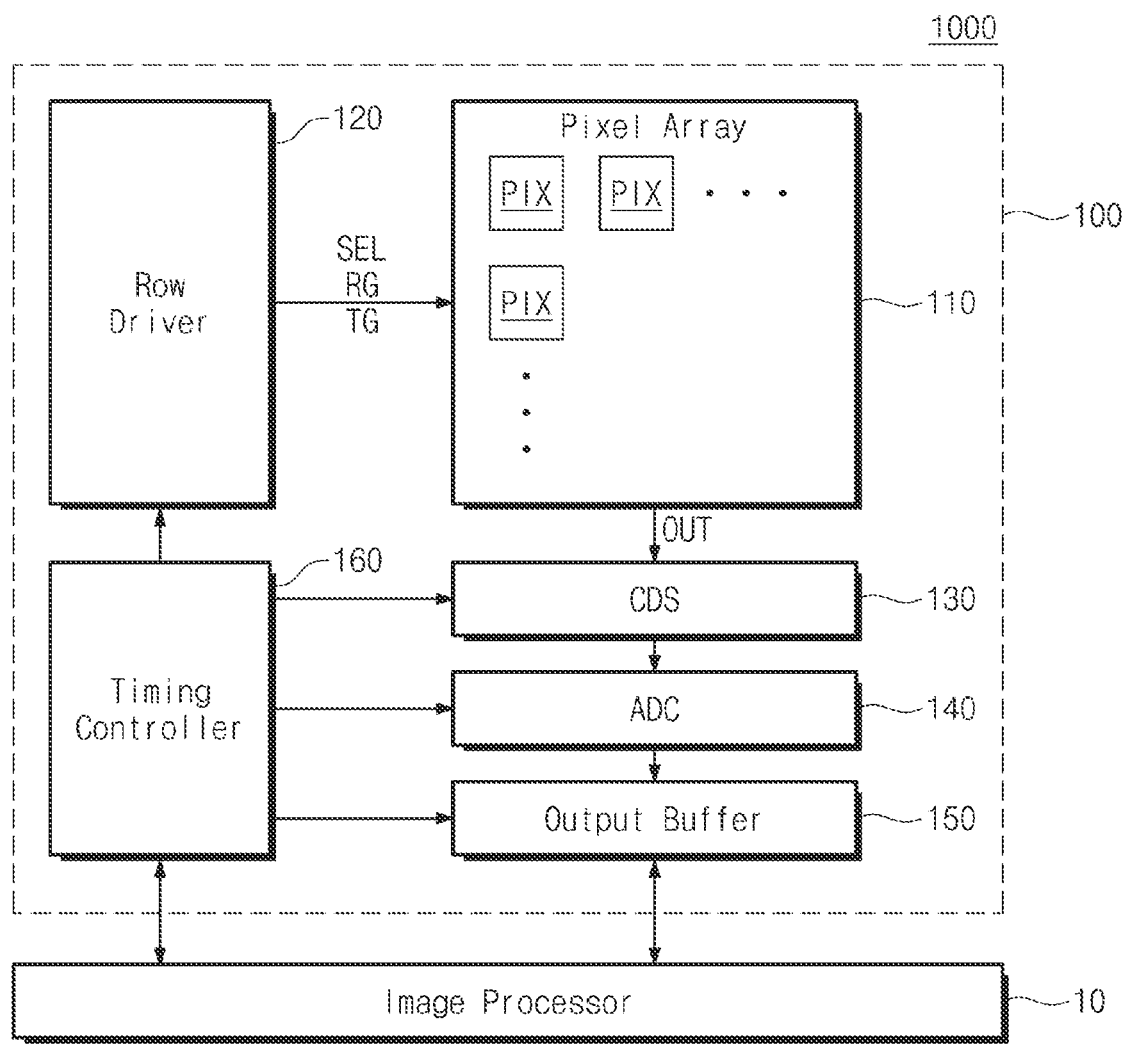
FIG. 1 is a block diagram of an electronic device according to an embodiment of the present disclosure.

Embodiments of the present disclosure will be described more fully hereinafter with reference to the accompanying drawings. Like reference numerals may refer to like elements throughout the accompanying drawings, and thus, additional description may be omitted to avoid redundancy.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

It will be understood that when an element is referred to as being "on", "connected to", "coupled to", or "adjacent to" another element, it can be directly on, connected, coupled, or adjacent to the other element, or intervening elements may be present. Other words used to describe the relationships between elements should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

FIG. 1 is a block diagram of an electronic device 1000 according to an embodiment of the present disclosure. Referring to FIG. 1, the electronic device 1000 may include an image sensor 100 and an image processor 10. The image sensor 100 may operate in response to a control command provided from the image processor 10. The image sensor 100 may convert a light from an object into an electrical signal and may transmit the electrical signal to the image processor 10 as image data.

The image sensor 100 may include a pixel array 110, a row driver 120, a correlated double sampler (CDS) 130, an analog-to-digital converter (ADC) 140, an output buffer 150, and a timing controller 160. The pixel array 110 may include a plurality of pixels PIX arranged in a row direction and a column direction. Each of the pixels PIX may include a photoelectric element (e.g., a photodiode) that receives a light and generates charges based on the received light.

In some embodiments, at least a part of the plurality of pixels PIX may include two or more photodiodes. The image sensor 100 may provide auto focus based on a phase difference of electrical signals generated from the two or more photodiodes included in the at least a part of the plurality of pixels PIX. That is, the image sensor 100 may provide phase detection auto focus.

Each of the plurality of pixels PIX may further include a circuit for generating an electrical signal from charges generated by a photodiode(s). The circuit included in each of the plurality of pixels PIX and an operation of the circuit will be described in further detail below.

The pixel array 110 may be controlled by sensor driving signals, which are transmitted from the row driver 120. The sensor driving signals may include, for example, a selection signal SEL, a reset signal RG, and a transfer gate signal TG. A plurality of electrical signals that are sensed by respective pixels in response to the sensor driving signals may be transferred to the CDS 130 as output signals OUT. The arrangement of the pixels PIX in the pixel array 110 will be described in further detail below.

The row driver 120 may select one of a plurality of rows of the pixel array 110 under control of the timing controller 160. The row driver 120 generates the selection signal SEL for the purpose of selecting one or more of the plurality of rows. The row driver 120 may sequentially enable (or activate) the reset signal RG and the transfer gate signal TG for pixels corresponding to the selected row. As such, the output signals OUT associated with illuminance generated from the pixels of the selected row may be sequentially provided to the CDS 130.

The CDS 130 may be connected to pixels included in a row selected by the selection signal SEL through column lines. The CDS 130 may detect pixel voltages respectively generated by pixels by performing correlated double sampling. For example, the CDS 130 may sample and hold a pixel voltage generated by each pixel. The CDS 130 may perform correlated double sampling on a level of a specific noise and a level of a pixel voltage output from each pixel and may output a voltage of a level corresponding to a result of the correlated double sampling, that is, a level difference thereof. As such, the CDS 130 may detect a reset voltage when the reset signal RG is enabled and a pixel voltage corresponding to charges integrated in a photodiode of each pixel PIX.

The ADC 140 may convert the reset voltage and the pixel voltage detected by the CDS 130 into a digital signal. For example, the ADC 140 may convert the pixel voltage detected by the CDS 130 into a pixel signal. Pixel signals converted by the ADC 140, that is, digital signals, may be provided to the output buffer 150.

The output buffer 150 may store the digital signals converted by the ADC 140. The output buffer 150 may transmit the digital signals stored therein to the image processor 10 as image data under control of the timing controller 160.

The timing controller 160 may control the pixel array 110, the row driver 120, the CDS 130, the ADC 140, and the output buffer 150. The timing controller 160 may generate control signals which are utilized for operations of the pixel array 110, the row driver 120, the CDS 130, the ADC 140, and the output buffer 150, such as, for example, a clock signal and a timing control signal. In response to a request received from the image processor 10, the timing controller 160 may generate control signals and may provide the control signals to any other components of the image sensor 100.

The image processor 10 may process image data received from the output buffer 150. For example, the image processor 10 may calculate a phase difference between two pixels from the image data. The image processor 10 may perform auto focus processing based on the calculated phase difference. The image processor 10 may correct image data of a pixel from which a pixel voltage is not detected, based on image data associated with pixels adjacent to the pixel from which the pixel voltage is not detected. Image data processed by the image processor 10 may be stored in a storage device or may be output to a display device.

Figure 2:
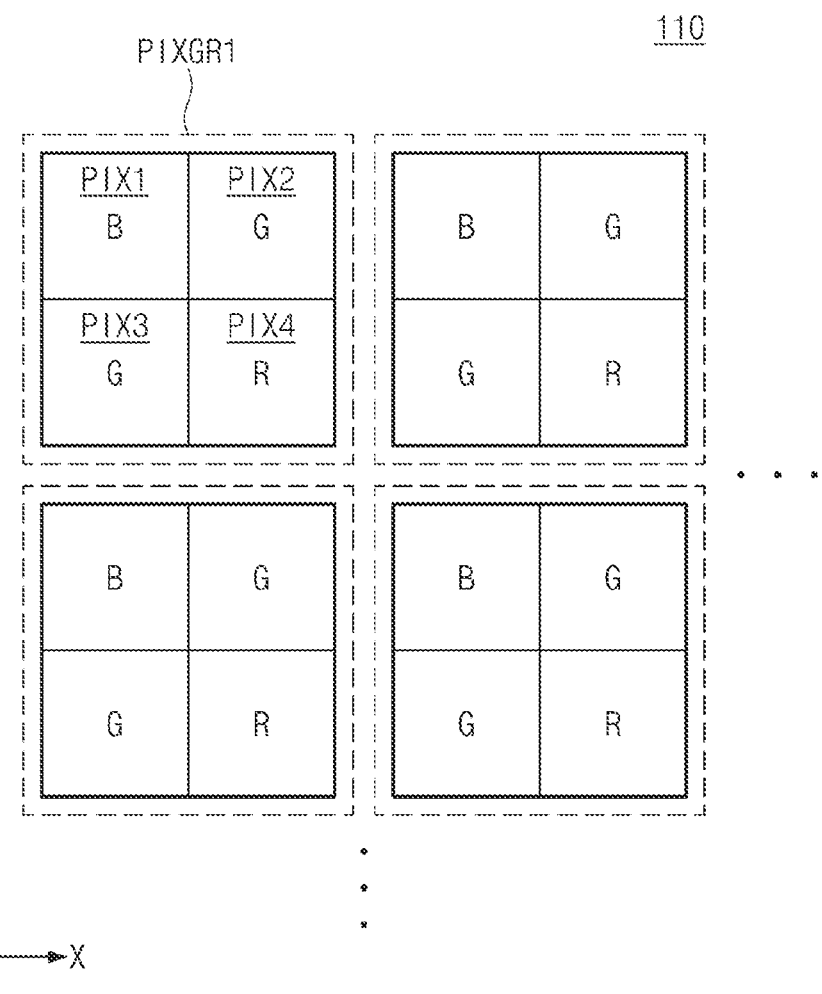
FIG. 2 illustrates a portion of a pixel array of FIG. 1 according to an embodiment of the present disclosure.

FIG. 2 illustrates a part of the pixel array 110 of FIG. 1 according to an embodiment of the present disclosure.

Referring to FIGS. 1 and 2, the pixel array 110 of FIG. 1 may include a first pixel group PIXGR1 repeatedly disposed in the row direction (e.g., an X-axis direction) and the column direction (e.g., a Y-axis direction).

The first pixel group PIXGR1 may include pixels PIX1, PIX2, PIX3, and PIX4. Color filters may be disposed over the pixels PIX1, PIX2, PIX3, and PIX4. In the embodiment illustrated in FIG. 2, a first unit color filter array including four color filters may be disposed on the first pixel group PIXGR1. The first unit color filter array may include blue (B), green (G), red (R), and green (G) color filters sequentially arranged clockwise from an upper left end thereof. The first unit color filter array may be disposed repeatedly along the X-axis and the Y-axis.

The pixels PIX1, PIX2, PIX3, and PIX4 may correspond to the color filters of the first unit color filter array. In the embodiment illustrated in FIG. 2, the pixel PIX1 may correspond to the blue (B) color filter, the pixel PIX2 and the pixel PIX3 may correspond to the green (G) color filter, and the pixel PIX4 may correspond to the red (R) color filter. As such, the pixel PIX1 may output information corresponding to the amount of blue (B) light in the form of a current or voltage, the pixels PIX2 and PIX3 may output information corresponding to the amount of green (G) light in the form of a current or voltage, and the pixel PIX4 may output information corresponding to the amount of red (R) light in the form of a current or voltage.

Figure 3:
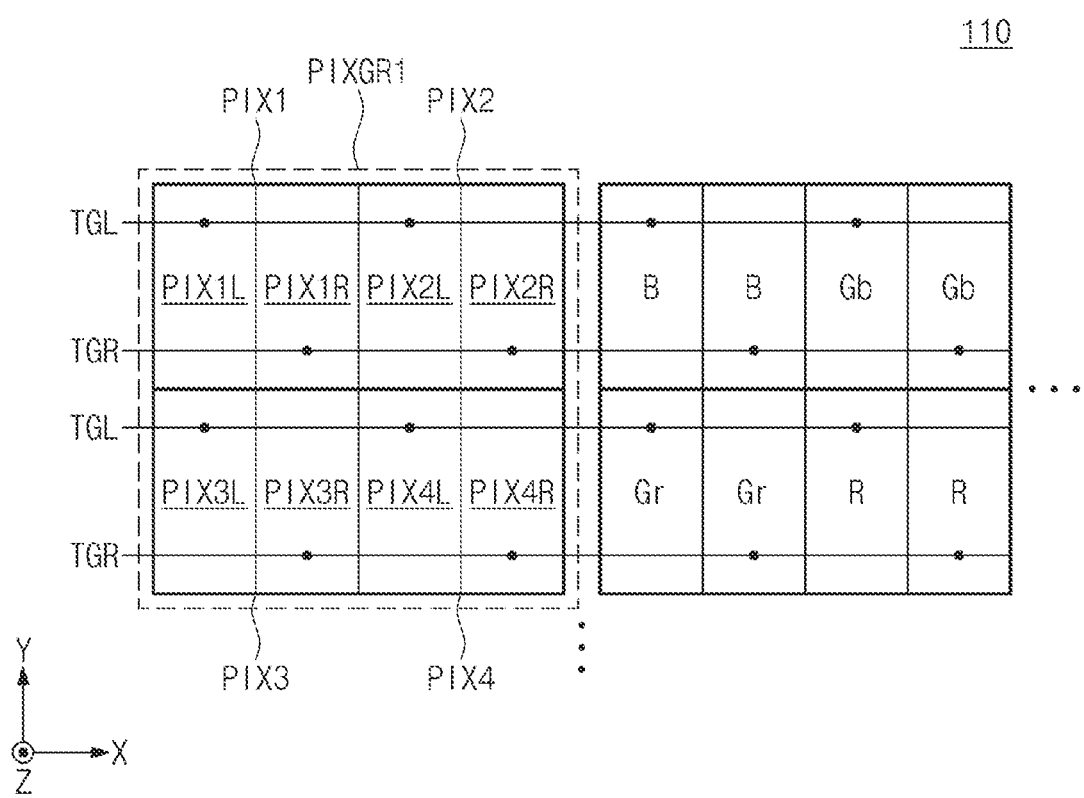
FIG. 3 illustrates a pixel group of FIG. 2 in more detail according to an embodiment of the present disclosure.

FIG. 3 illustrates the first pixel group PIXGR1 of FIG. 2 in more detail according to an embodiment of the present disclosure.

Referring to FIGS. 1 to 3, the pixels PIX1, PIX2, PIX3, and PIX4 of the first pixel group PIXGR1 may include sub-pixel pairs, respectively. For example, the pixel PIX1 may include sub-pixels PIX1L and PIX1R, the pixel PIX2 may include sub-pixels PIX2L and PIX2R, the pixel PIX3 may include sub-pixels PIX3L and PIX3R, and the pixel PIX4 may include sub-pixels PIX4L and PIX4R. Each of the sub-pixels PIX1L, PIX1R, PIX2L, PIX2R, PIX3L, PIX3R, PIX4L, and PIX4R may include one photoelectric conversion element.

Two sub-pixels included in one pixel may receive different transfer gate signals. In the embodiment illustrated in FIG. 3, the sub-pixel PIX1L included in the pixel PIX1 may receive a transfer gate signal TGL, and the sub-pixel PIX1R included in the pixel PIX1 may receive a transfer gate signal TGR. As the transfer gate signal TGL is enabled, a pixel voltage corresponding to the sub-pixel PIX1L may be detected by the CDS 130. Then, as the transfer gate signal TGR is enabled, a pixel voltage corresponding to the sub-pixel PIX1R may be detected by the CDS 130.

As the transfer gate signals TGL and TGR are sequentially enabled, pixel voltages corresponding to sub-pixels receiving the transfer gate signal TGL and pixel voltages corresponding to sub-pixels receiving the transfer gate signal TGR may be sequentially detected. The detected pixel voltages may be sequentially converted into pixel signals so as to be transmitted to the image processor 10.

The image processor 10 may compute a phase difference based on phase information of the pixel signals corresponding to the transfer gate signal TGL and phase information of the pixel signals corresponding to the transfer gate signal TGR. The image processor 10 may calculate a distance between the image sensor 100 and an object, based on a result of the computation. The image processor 10 may generate a control signal for adjusting the distance between the image sensor 100 and the object, based on the calculated distance. For example, the image processor 10 may generate a control signal for moving a location of a lens of the image sensor 100. As such, the distance between the image sensor 100 and the object may be adjusted.

Figure 4:
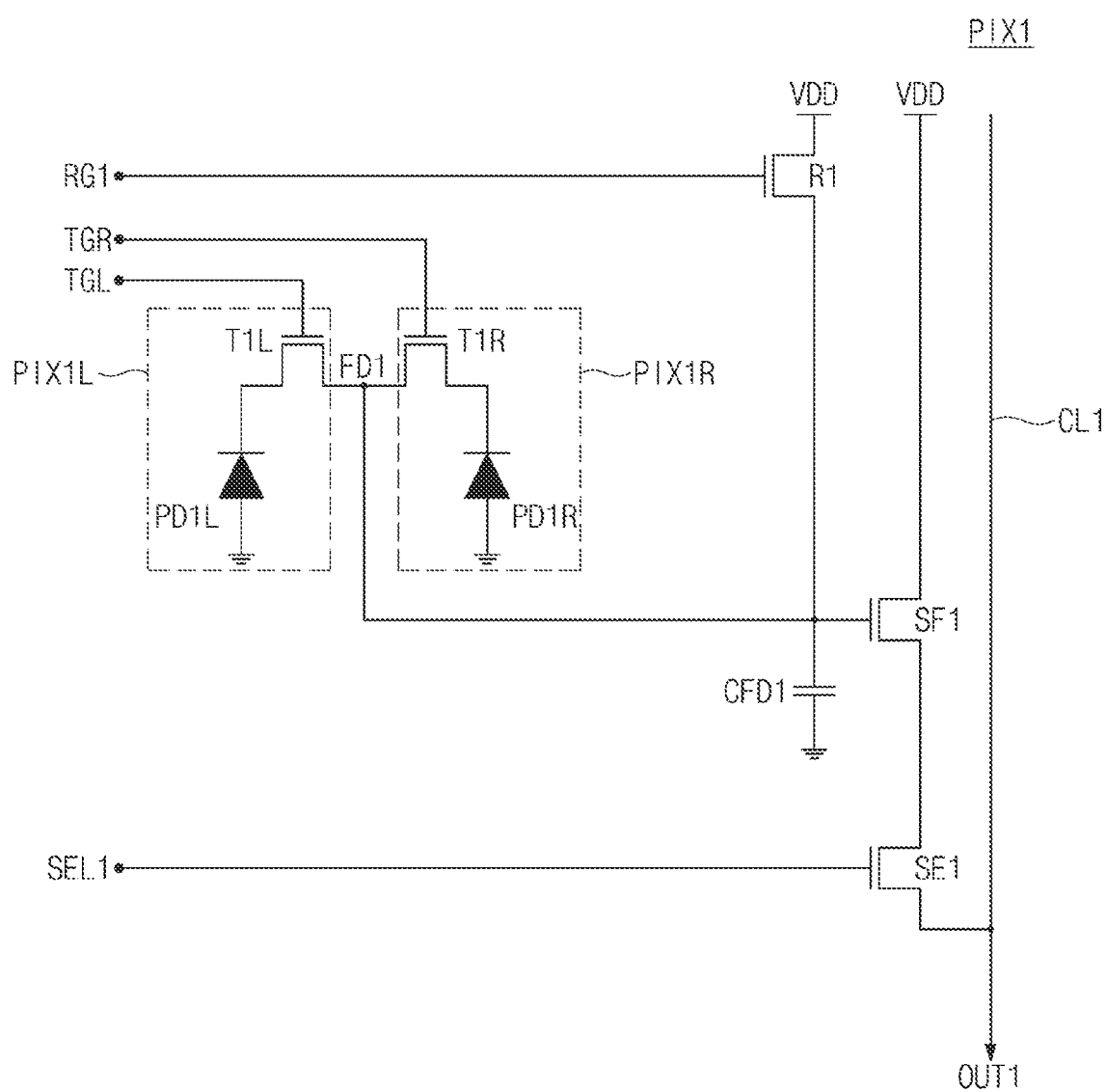
FIG. 4 is a circuit diagram of a pixel of FIG. 2 according to an embodiment of the present disclosure.

FIG. 4 is a circuit diagram of the pixel PIX1 of FIG. 2 according to an embodiment of the present disclosure.

Referring to FIGS. 1 to 4, the pixel PIX1 may include photodiodes PD1L and PD1R, transfer transistors T1L and T1R, a floating diffusion area FD1 (or a floating diffusion node), a reset transistor R1, a source follower transistor SF1, and a select transistor SE1.

Each of the photodiodes PD1L and PD1R may generate and integrate electrons (or charges) corresponding to a light incident onto the image sensor 100. In some embodiments, each of the photodiodes PD1L and PD1R may also be implemented with one of photoelectric conversion elements such as, for example, a photo transistor, a photo gate, and a pinned photodiode, or a combination thereof. In the embodiment illustrated in FIG. 4, the photodiode PD1L may correspond to the sub-pixel PIX1L, and the photodiode PD1R may correspond to the sub-pixel PIX1R.

First ends of the transfer transistors T1L and T1R may be respectively connected to the photodiodes PD1L and PD1R, and second ends of the transfer transistors T1L and T1R may be connected in common with the floating diffusion area FD1. In response to the transfer gate signals TGL and TGR, the transfer transistors T1L and T1R may transfer electrons integrated by the photodiodes PD1L and PD1R to the floating diffusion area FD1. The transfer gate signals TGL and TGR may be included in the transfer gate signal TG of FIG. 1.

The floating diffusion area FD1 may integrate and store the electrons provided from the transfer transistors T1L and T1R. A capacitance of the floating diffusion area FD1 may be referred to as "CFD1". A voltage level of the floating diffusion area FD1 may be determined depending on the capacitance CFD1 and the amount of electrons provided from the transfer transistors T1L and T1R.

In the embodiment illustrated in FIG. 4, the floating diffusion area FD1 is shared by two photodiodes PD1L and PD1R. However, embodiments of the present disclosure are not limited thereto. For example, in some embodiments, three or more photodiodes may share one floating diffusion area FD1.

The reset transistor R1 may reset the floating diffusion area FD1. For example, the reset transistor R1 may electrically connect the floating diffusion area FD1 and a power supply voltage VDD based on a reset signal RG1. The reset transistor R1 may remove or discharge electrons stored at the floating diffusion area FD1 by driving the floating diffusion area FD1 with the power supply voltage VDD in response to the reset signal RG1. The reset signal RG1 may be included in the reset signal RG of FIG. 1.

The source follower transistor SF1 may be connected between the power supply voltage VDD and the select transistor SE1. A gate terminal of the source follower transistor SF1 may be connected to the floating diffusion area FD1. The source follower transistor SF1 may output an output signal to the select transistor SE1 based on a voltage level of the floating diffusion area FD1. The source follower transistor SF1 may be a source follower buffer amplifier.

The select transistor SE1 may be connected between the source follower transistor SF1 and an output line. The select transistor SE1 may output an output signal OUT1 to a column line CL1 based on a selection signal SELL The selection signal SEL1 may be included in the selection signal SEL of FIG. 1. The output signal OUT1 may be included in the output signal OUT of FIG. 1. An example is illustrated in which the transistors described above are n-type metal-oxide semiconductor (NMOS) transistors. However, embodiments of the present disclosure are not limited thereto. For example, in some embodiments, the transistors may be implemented as a p-type metal-oxide semiconductor (PMOS) transistor or a combination of a PMOS transistor and an NMOS transistor.

In the embodiment illustrated in FIG. 4, to provide an auto focus function, pixel voltages are detected from respective photodiodes connected to one floating diffusion area. For example, to individually obtain a pixel voltage corresponding to the sub-pixel PIX1L and a pixel voltage corresponding to the sub-pixel PIX1R, first, the reset signal RG1 may be enabled, and the floating diffusion area FD1 may be reset. Next, the transfer gate signal TGL may be enabled, and charges stored at the photodiode PD1L may be integrated at the floating diffusion area FD1. Then, the select signal SEL1 may be enabled, and a pixel voltage corresponding to the photodiode PD1L may be output through the column line CL1 as the output signal OUT1. Next, the reset signal RG1 may again be enabled such that the floating diffusion area FD1 is reset. As in the description given with reference to the photodiode PD1L, a pixel voltage corresponding to the photodiode PD1R may be output through the column line CL1 as the output signal OUT1. Accordingly, pixel voltages may be respectively detected from a plurality of pixels PIX multiple times, thereby causing an increase of a time and power consumption for auto focus processing and readout.

In some embodiments of the present disclosure, unlike the above scheme, when a floating diffusion area is reset once, pixel voltages corresponding to a plurality of photodiodes connected to the floating diffusion area may be respectively detected. For example, after the floating diffusion area FD1 is reset, a first pixel voltage corresponding to charges integrated at the photodiode PD1L may first be detected, and a second pixel voltage corresponding to a sum of charges integrated at the photodiode PD1L and charges integrated at the photodiode PD1R may then be detected. The image processor 10 may compute a phase difference by using the first pixel voltage and the second pixel voltage. In this case, a third pixel voltage corresponding to charges integrated at the photodiode PD1R may first be calculated from the first pixel voltage and the second pixel voltage, and a phase difference may then be computed based on the first pixel voltage and the third pixel voltage.

Figure 5:
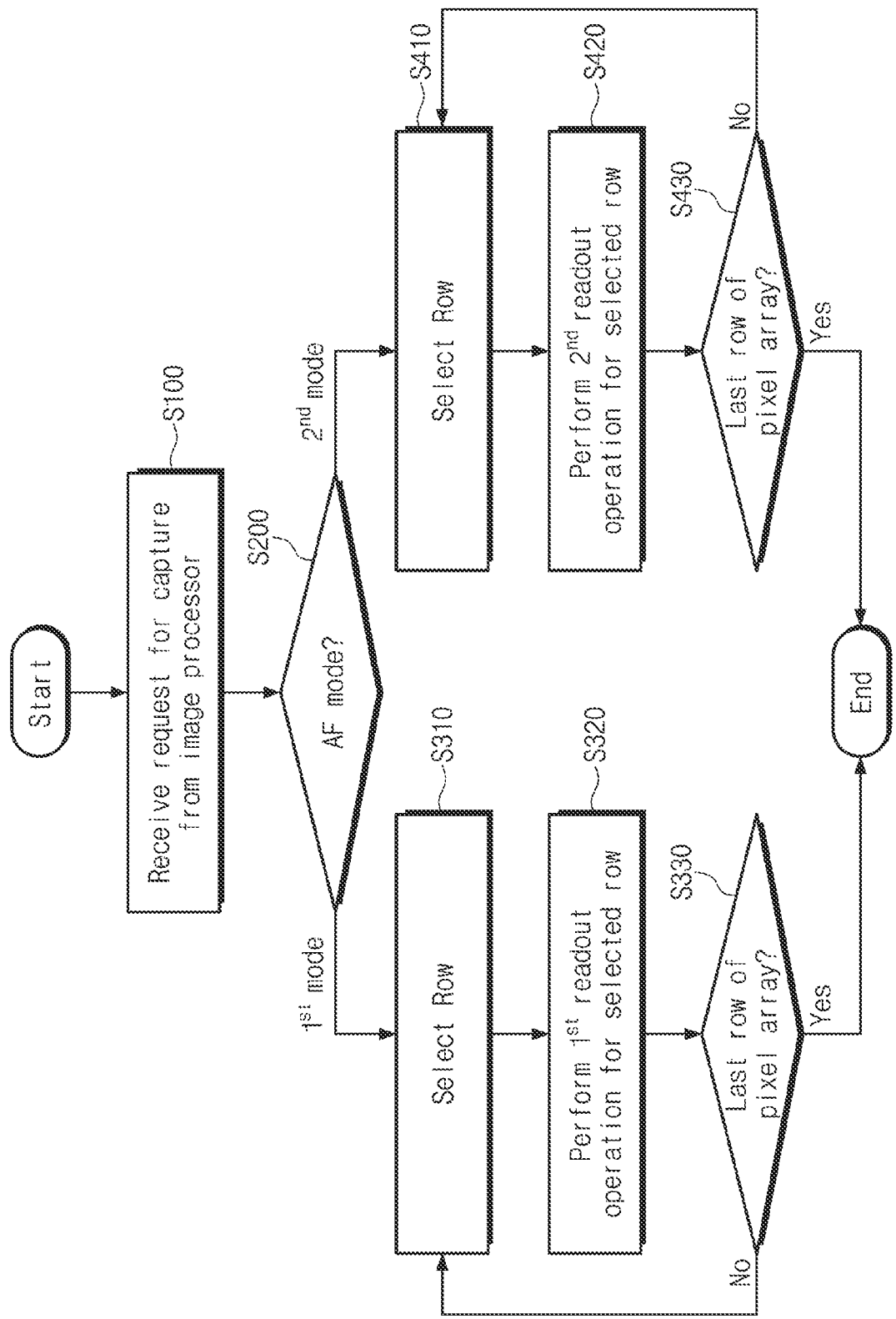
FIG. 5 is a flowchart illustrating an operation method of an image sensor of FIG. 1, according to an embodiment of the present disclosure.
Figure 6A:
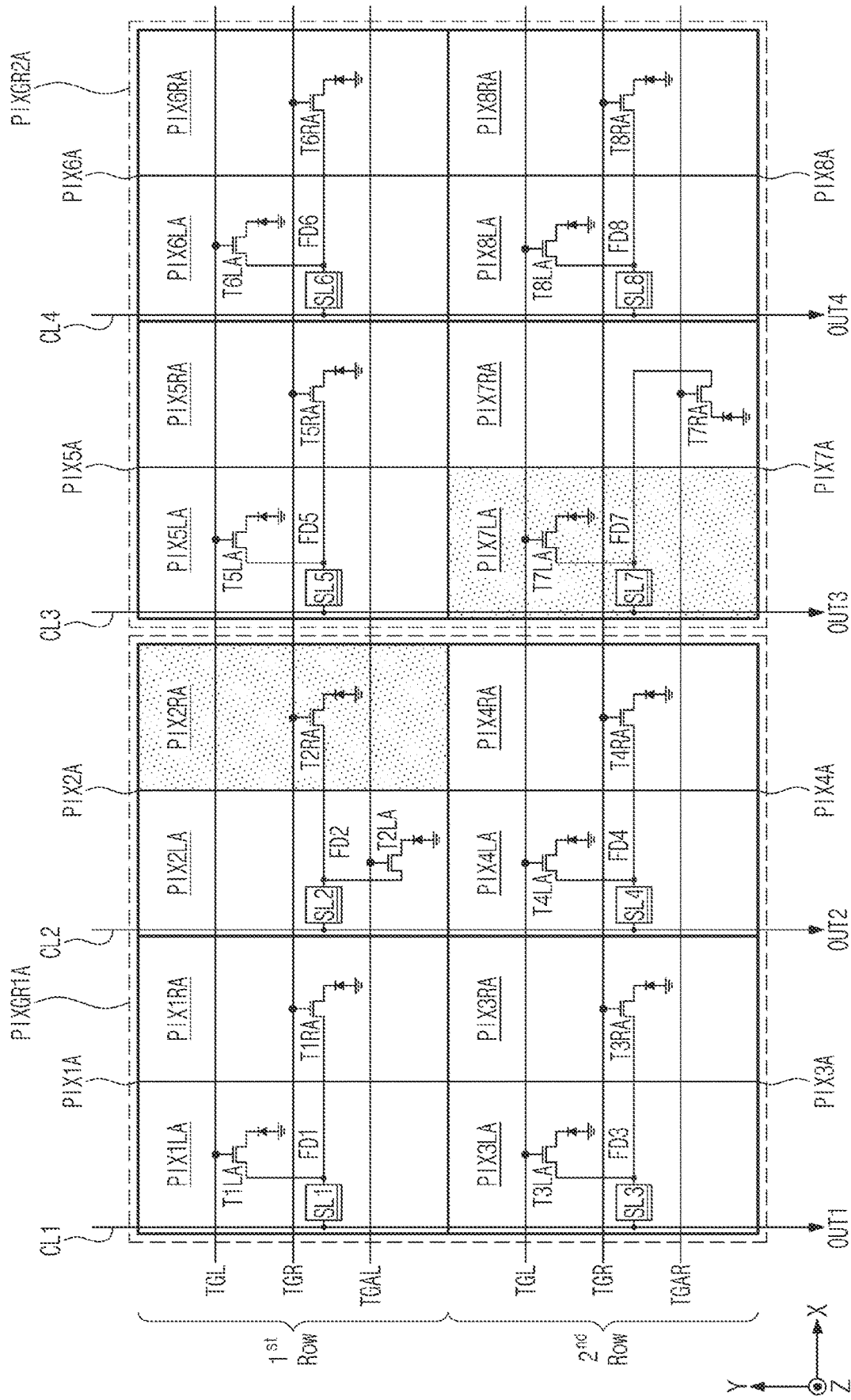
FIGS. 6A to 6C illustrate pixel groups repeatedly disposed in a pixel array in more detail, according to some embodiments of the present disclosure.
Figure 6B:
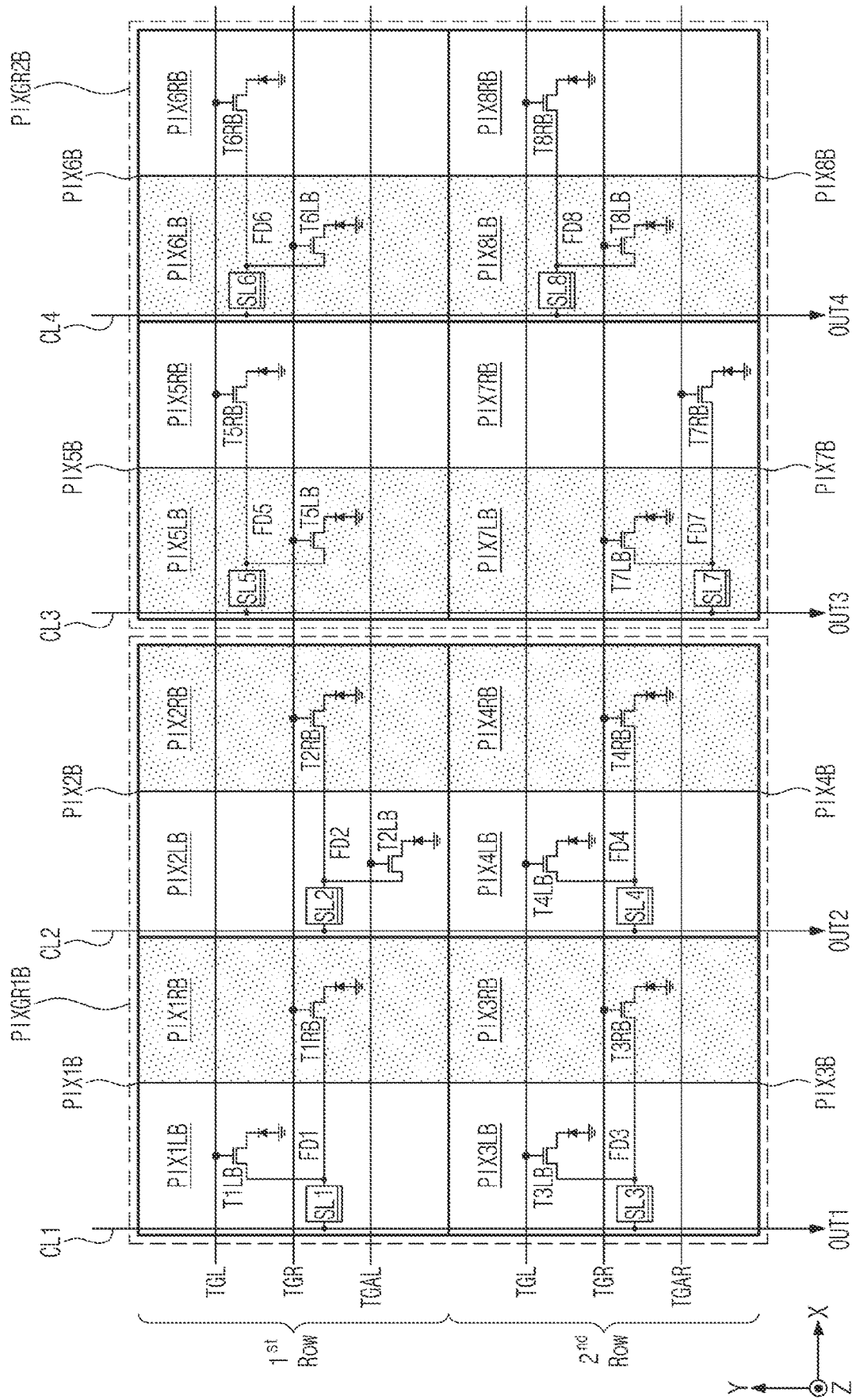
Figure 6C:
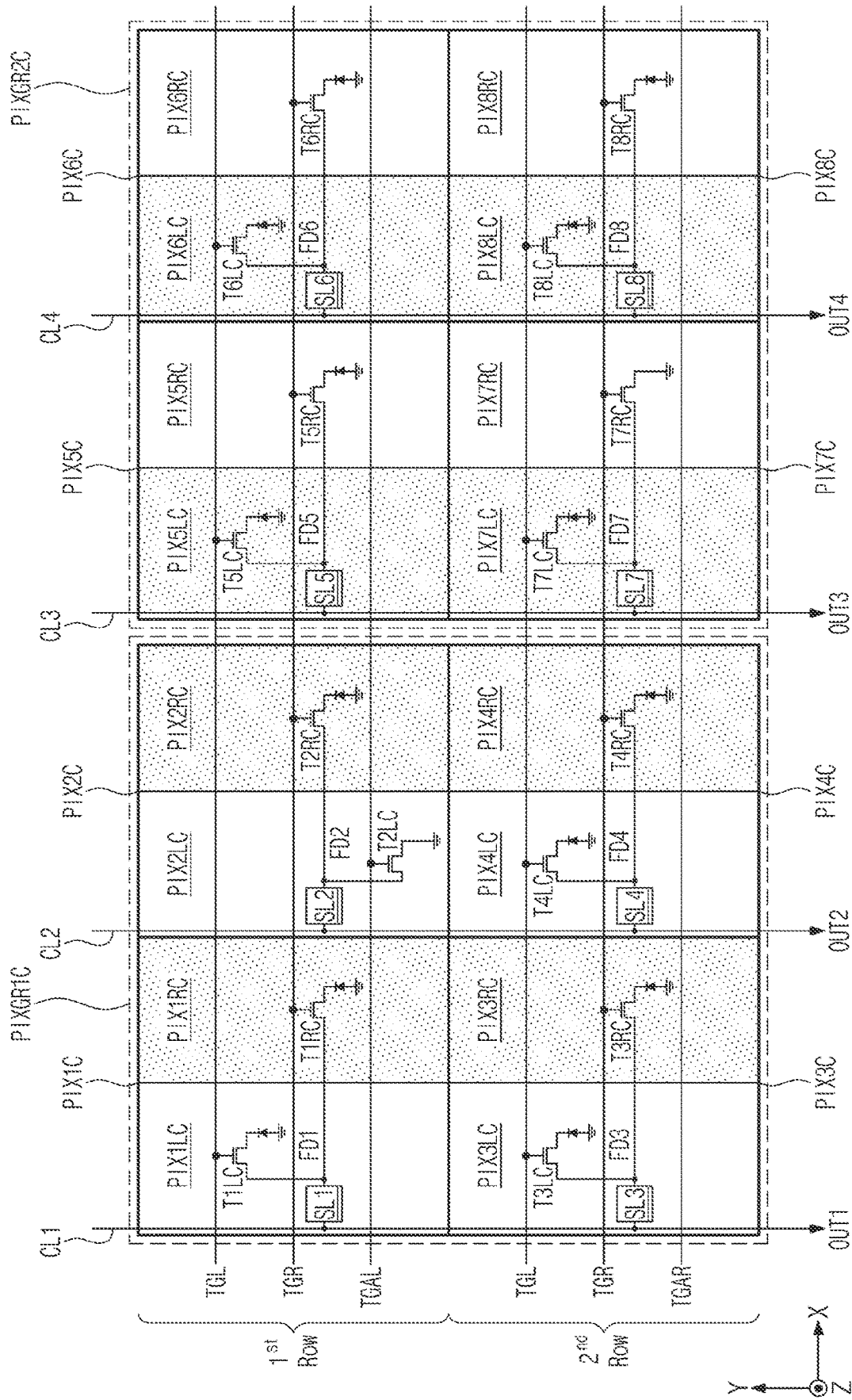

FIG. 5 is a flowchart illustrating an operation method of the image sensor 100 of FIG. 1, according to an embodiment of the present disclosure. FIGS. 6A to 6C illustrate pixel groups PIXGR1A, PIXGR2A, PIXGR1B, PIXGR2B, PIXGR1C, and PIXGR2C repeatedly disposed in the pixel array 110 in more detail, according to some embodiments of the present disclosure. Below, embodiments illustrated in FIGS. 6A to 6C will be described in detail with reference to FIGS. 1 to 5.

As in the first pixel group PIXGR1 of FIG. 2, a first unit color filter array including green (G), red (R), green (G), and blue (B) color filters sequentially arranged clockwise from an upper left end thereof may be located on each of pixel groups PIXGR1A, PIXGR2A, PIXGR1B, PIXGR2B, PIXGR1C, and PIXGR2C. The pixel array 110 of FIG. 1 may include the pixel groups PIXGR1A and PIXGR2A/ PIXGR1B and PIXGR2B/PIXGR1C and PIXGR2C repeatedly disposed in the row direction and the column direction.

Unlike the embodiments illustrated in FIGS. 3 and 4, in the embodiment illustrated in FIGS. 6A to 6C, at least a part of rows of the pixel array 110 may be connected to three transmission metal lines associated with transfer gate signals TGL, TGR, TGAL, and TGAR. For example, sub-pixels PIX1LA, PIX1RA, PIX2LA, PIX2RA, PIX5LA, PIX5RA, PIX6LA, and PIX6RA disposed in the first row may be connected to one of three transmission metal lines respectively corresponding to the transfer gate signals TGL, TGR, and TGAL. Each transmission metal line may be referred to based on the transfer gate signal transmitted on that line. For example, the transmission metal line on which the transfer gate signal TGL is transmitted may be referred to as a TGL transmission metal line, the transmission metal line on which the transfer gate signal TGR is transmitted may be referred to as a TGR transmission metal line, and the transmission metal line on which the transfer gate signal TGAL is transmitted may be referred to as a TGAL transmission metal line. According to embodiments, multiple different transmission metal lines may be utilized to transmit the same transfer gate signal. Thus, some embodiments may include a first TGL transmission metal line, a second TGL transmission metal line, a first TGR transmission metal line, a second TGR transmission metal line, etc. Sub-pixels PIX3LA, PIX3RA, PIX4LA, PIX4RA, PIX7LA, PIX7RA, PIX8LA, and PIX8RA disposed in the second row may be connected to one of three transmission metal lines respectively corresponding to the transfer gate signals TGL, TGR, and TGAR.

In the embodiment illustrated in FIG. 6A, the pixel group PIXGR1A and the pixel group PIXGR2A may be disposed adjacent to each other. The pixel group PIXGR2A may be disposed on one side of the pixel group PIXGR1A in a first direction (e.g., an x-axis direction). Each of the pixel group PIXGR1A and the pixel group PIXGR2A may include four pixels, each of which may include two sub-pixels. For example, the pixel group PIXGR1A may include pixels PIX1A, PIX2A, PIX3A, and PIX4A, and the pixel group PIXGR2A may include pixels PIX5A, PIX6A, PIX7A, and PIX8A. Each of the pixels PIX1A, PIX2A, PIX3A, PIX4A, PIX5A, PIX6A, PIX7A, and PIX8A may include two sub-pixels (e.g., the pixel PIX1A may include sub-pixels PIX1LA and PIX1RA).

Two sub-pixels included in one pixel may share one floating diffusion area. The floating diffusion area may be connected to a column line through a selecting block. The selecting block may include elements such as the reset transistor R1, the source follower transistor SF1, or the select transistor SE1 of FIG. 4. For example, the sub-pixel PIX1LA and the sub-pixel PIX1RA included in the pixel PIX1A may share one floating diffusion area FD1. The floating diffusion area FD1 may be connected to the column line CL1 through a selecting block SL1. In response to an operation of the selecting block SL1 and a selecting block SL3, a pixel voltage corresponding to charges stored at a photodiode of one of pixels (e.g., the pixels PIX1A and PIX3A) sharing the column line CL1 may be output as the output signal OUT1.

Floating diffusion areas FD2, FD3, FD4, FD5, FD6, FD7, and FD8 may be implemented to be similar to the floating diffusion area FD1 and may operate to be similar thereto. Selecting blocks SL2, SL3, SL4, SL5, SL6, SL7, and SL8 may be implemented to be similar to the selecting block SL1 and may operate to be similar thereto. Column lines CL2, CL3, and CL4 may be implemented to be similar to the column line CL1 and may operate to be similar thereto. Output signals OUT2, OUT3, and OUT4 may be output to be similar to the output signal OUT1.

Sub-pixels PIX1LA, PIX5LA, and PIX6LA among sub-pixels PIX1LA, PIX1RA, PIX2LA, PIX2RA, PIX5LA, PIX5RA, PIX6LA, and PIX6RA disposed in the first row may include transfer transistors T1LA, T5LA, and T6LA receiving the transfer gate signal TGL, respectively. The sub-pixels PIX1RA, PIX2RA, PIX5RA, and PIX6RA may include transfer transistors T1RA, T2RA, T5RA, and T6RA receiving the transfer gate signal TGR, respectively. The sub-pixel PIX2LA may include a transfer transistor T2LA receiving the transfer gate signal TGAL different from the transfer gate signals TGR and TGL.

Sub-pixels PIX3LA, PIX4LA, PIX7LA, and PIX8LA among sub-pixels PIX3LA, PIX3RA, PIX4LA, PIX4RA, PIX7LA, PIX7RA, PIX8LA, and PIX8RA disposed in the second row may include transfer transistors T3LA, T4LA, T7LA, and T8LA receiving the transfer gate signal TGL, respectively. The sub-pixels PIX3RA, PIX4RA, and PIX8RA may include transfer transistors T3RA, T4RA, and T8RA receiving the transfer gate signal TGR, respectively. The sub-pixel PIX7RA may include a transfer transistor T7RA receiving the transfer gate signal TGAR different from the transfer gate signals TGR and TGL.

In some embodiments of the present disclosure, when a readout operation is performed, a transfer gate signal(s) (e.g., the transfer gate signal TGL and the transfer gate signal TGAL/TGAR) may first be enabled, and the remaining transfer gate signal(s) (e.g., the transfer gate signal TGR and the transfer gate signal TGAR) may then be enabled.

In some embodiments of the present disclosure, when the readout operation is performed, a detection operation may be performed on each row only once by simultaneously enabling only some transfer gate signals (e.g., the transfer gate signal TGR and TGL). The image processor 10 may perform auto focus processing by computing a phase difference based on a part of detected pixel voltages and may perform image processing based on the remaining pixel voltages.

Referring to FIG. 5, the image sensor 100 may perform operation S100, operation S200, operation S310 to operation S330, and operation S410 to operation S430. In operation S100, the image sensor 100 may receive a capture request (or command) from the image processor 10. For example, the image processor 10 may request the image processor 10 to generate image data in response to a request from a user.

In operation S200, the image sensor 100 may determine whether an auto focus mode is a first mode or a second mode. The image sensor 100 may operate in one of the first mode or the second mode based on the request from the image processor 10. The image sensor 100 may perform one of a first readout operation or a second readout operation on each frame generated by the pixel array 110, based on the determined mode.

When the auto focus mode is determined as the first mode, the image sensor 100 may perform operation S310 to operation S330. In operation S310, the image sensor 100 may select a row. For example, in response to control signals generated by the timing controller 160, the row driver 120 of the image sensor 100 may select a row targeted for readout from among rows of the pixel array 110.

In operation S320, the image sensor 100 may perform the first readout operation on the selected row. In the first readout operation, the image sensor 100 may first enable the reset signal RG to reset floating diffusion areas included in the selected row. Subsequently, the reset signal RG may be disabled, and only the transfer gate signal TGL and the transfer gate signal TGAL or TGAR may first be enabled. As such, pixel voltages may be detected from relevant sub-pixels. Next, the transfer gate signal TGL and the transfer gate signal TGAL or TGAR may be disabled, and the transfer gate signals TGR and TGAR may be (or, in some embodiments, only the transfer gate signal TGR may be) enabled. As such, relevant pixel voltages may be detected.

For example, in the embodiment illustrated in FIG. 6A, when the image sensor 100 selects a first row and performs the first readout operation on the first row, all the floating diffusion areas FD1, FD2, FD5, and FD6 of the first row may be reset, and the transfer gate signals TGL and TGAL may first be enabled. As such, pixel voltages corresponding to the sub-pixels PIX1LA, PIX2LA, PIX5LA, and PIX6LA may be detected from the first row. Subsequently, as the transfer gate signal TGR is enabled, pixel voltages corresponding to the sub-pixels PIX1RA, PIX2RA, PIX5RA, and PIX6RA may be detected from the first row. The image processor 10 may perform auto focus processing based on the pixel voltages detected from the first row.

In operation S330, the image sensor 100 may determine whether the row selected in operation S310 is the last row of the pixel array 110. For example, the image sensor 100 may determine whether the first readout operation is performed on all the rows of the pixel array 110. When the row selected in operation S310 is not the last row of the pixel array 110, the image sensor 100 may again perform operation S310 such that a next (or different) row is newly selected and the first readout operation is performed on the newly selected row.

For example, in the embodiment illustrated in FIG. 6A, after the first readout operation is performed on the first row, in operation S330, the image sensor 100 may again perform operation S310 to select a second row. When the image sensor 100 performs the first readout operation on the second row, the floating diffusion areas FD3, FD4, FD7, and FD8 of the second row may be reset, and the transfer gate signal TGL may first be enabled. As such, pixel voltages corresponding to the sub-pixels PIX3LA, PIX4LA, PIX7LA, and PIX8LA may be detected from the second row. Subsequently, as the transfer gate signals TGR and TGAR are enabled, pixel voltages corresponding to the sub-pixels PIX3RA, PIX4RA, PIX7RA, and PIX8RA may be detected from the second row. The image processor 10 may perform auto focus processing based on the pixel voltages detected from the second row.

When the auto focus mode is determined as the second mode, the image sensor 100 may perform operation S410 to operation S430. In operation S410, the image sensor 100 may select a row. For example, as in the manner in operation S310, the image sensor 100 may perform operation S410.

In operation S420, the image sensor 100 may perform the second readout operation on the selected row. In the second readout operation, the image sensor 100 may first enable the reset signal RG to reset floating diffusion areas of the selected row. Subsequently, the image sensor 100 may enable the transfer gate signals TGL and TGR to detect relevant pixel voltages.

For example, in the embodiment illustrated in FIG. 6A, when the image sensor 100 performs the second readout operation on the first row, all of the floating diffusion areas FD1, FD2, FD5, and FD6 of the first row may be reset, and only the transfer gate signals TGL and TGR may be simultaneously enabled. In this case, like the pixel PIX1A, in a pixel where two sub-pixels included therein respectively receive the transfer gate signals TGL and TGR, a sum pixel voltage corresponding to a sum of charges integrated at photodiodes respectively included in the two sub-pixels may be detected once. For example, a sum pixel voltage of the sub-pixels PIX1A and PIX2A, a sum pixel voltage of the sub-pixels PIX5RA and PIX5LA, a sum pixel voltage of the sub-pixels PIX6LA and PIX6RA, and a pixel voltage corresponding to the sub-pixel PIX2RA may be detected from the first row.

In operation S430, the image sensor 100 may determine whether the row selected in operation S410 is the last row of the pixel array 110. For example, the image sensor 100 may determine whether the second readout operation is performed on all the rows of the pixel array 110. When the row selected in operation S410 is not the last row of the pixel array 110, the image sensor 100 may again perform operation S410 such that a next (or different) row is newly selected and the second readout operation is performed on the newly selected row.

For example, in the embodiment illustrated in FIG. 6A, after the second readout operation is performed on the first row, in operation S430, the image sensor 100 may again perform operation S410 to select a second row. When the image sensor 100 performs the second readout operation on the second row, the floating diffusion areas FD3, FD4, FD7, and FD8 of the second row may be reset, and only the transfer gate signals TGL and TGR may be simultaneously enabled. As such, a sum pixel voltage of the sub-pixels PIX3RA and PIX3LA, a sum pixel voltage of the sub-pixels PIX4RA and PIX4LA, a sum pixel voltage of the sub-pixels PIX8LA and PIX8RA, and a pixel voltage corresponding to the sub-pixel PIX7LA may be detected from the second row.

The image processor 10 may perform auto focus processing based on at least a part of the pixel voltages detected in response to the transfer gate signals TGL and TGR and may perform image processing based on the remaining pixel voltages. For example, the image processor 10 may perform auto focus processing based on the pixel voltages corresponding to the sub-pixels PIX2RA and PIX7LA from among the detected pixel voltages and may perform image processing based on the sum pixel voltages of the remaining sub-pixels PIX1LA, PIX1RA, PIX3LA, PIX3RA, PIX4LA, PIX4RA, PIX5LA, PIX5RA, PIX6LA, PIX6RA, PIX8LA, and PIX8RA. For example, the image processor 10 may correct image data corresponding to the sub-pixels PIX2LA, PIX2RA, PIX7LA, and PIX7RA.

In some embodiments, the image sensor 100 may further include a binning circuit. The image sensor 100 may output image data corresponding to one pixel based on voltages respectively obtained from sub-pixels included in one pixel. The image sensor 100 may generate a binning signal corresponding to the pixel group PIXGR1A by performing binning on pixel voltages corresponding to the pixels PIX1A, PIX2A, PIX3A, and PIX4A. The generated binning signal may be converted into a digital signal so as to be provided to the image processor 10.

Differences between the embodiment illustrated in FIG. 6A and the embodiment illustrated in FIG. 6B will be described with reference to FIGS. 1, 4, 6A, and 6B. The pixel group PIXGR1B and the pixel group PIXGR2B may be disposed adjacent to each other. As in the pixel group PIXGR1A and the pixel group PIXGR2A, each of the pixel group PIXGR1B and the pixel group PIXGR2B may include four pixels, each of which may include two sub-pixels. In the embodiment of FIG. 6, the pixel group PIXGR1B includes pixels PIX1B, PIX2B, PIX3B, and PIX4B, and the pixel group PIXGR2B includes pixels PIX5B, PIX6B, PIX7B, and PIX8B.

Sub-pixels PIX1LB, PIX5RB, and PIX6RB among sub-pixels PIX1LB, PIX1RB, PIX2LB, PIX2RB, PIX5LB, PIX5RB, PIX6LB, and PIX6RB disposed in the first row may include transfer transistors T1LB, T5RB and T6RB receiving the transfer gate signal TGL, respectively. The sub-pixels PIX1RB, PIX2RB, PIX5LB, and PIX6LB may include transfer transistors T1RB, T2RB, T5LB, and T6LB receiving the transfer gate signal TGR, respectively. The sub-pixel PIX2LB may include a transfer transistor T2LB receiving the transfer gate signal TGAL different from the transfer gate signals TGR and TGL.

Sub-pixels PIX3LB, PIX4LB, and PIX8RB among sub-pixels PIX3LB, PIX3RB, PIX4LB, PIX4RB, PIX7LB, PIX7RB, PIX8LB, and PIX8RB disposed in the second row may include transfer transistors T3LB, T4LB, and T8RB receiving the transfer gate signal TGL, respectively. The sub-pixels PIX3RB, PIX4RB, PIX7LB, and PIX8LB may include transfer transistors T3RB, T4RB, T7LB, and T8LB receiving the transfer gate signal TGR, respectively. The sub-pixel PIX7RB may include a transfer transistor T7RB receiving the transfer gate signal TGAR different from the transfer gate signals TGR and TGL.

In some embodiments, in auto focus processing, a time taken to process a pixel signal corresponding to one of two sub-pixels in one pixel may be longer than a time taken to process a pixel signal corresponding to the other thereof. For example, a time taken to process a pixel signal corresponding to a right sub-pixel PIX1RB of the sub-pixels PIX1LB and PIX1RB in the pixel PIX1B may be longer than a time taken to process a left pixel signal PIX1LB.

In some embodiments of the present disclosure, a pixel voltage of at least one of photodiodes may be detected in response to a transfer gate signal (e.g., the transfer gate signal TGAL/TGAR) different from the transfer gate signals TGL and TGR. In such embodiments, after a first detection operation corresponding to the enable of first transfer gate signals of transfer gate signals is performed, some pixel signals for which a longer time is used for signal processing may be provided to the image processor 10. While a second detection operation corresponding to the enable of the remaining transfer gate signals is performed, the image processor 10 may process pixel signals input as a result of the first detecting operation. As a result, a total of time utilized to perform auto focus processing may be shortened.

For example, when the first readout operation is performed on the first row, all of the floating diffusion areas FD1, FD2, FD5, and FD6 of the first row may be reset, and the transfer gate signals TGL and TGAL may first be enabled. As such, pixel voltages corresponding to the sub-pixels PIX1LB, PIX2LB, PIX5RB, and PIX6RB may be detected from the first row. Before the remaining transfer gate signal TGR is enabled, the image processor 10 may start processing image data corresponding to the already detected pixel voltages. In this case, a time taken to process pixel signals corresponding to the sub-pixels PIX5RB, PIX6RB, PIX7RB, and PIX8RB for auto focus may be longer than a time taken to process pixel signals corresponding to the sub-pixels PIX5LB, PIX6LB, PIX7LB, and PIX8LB. Subsequently, the transfer gate signal TGR may be enabled. As such, pixel voltages corresponding to the sub-pixels PIX1RB, PIX2RB, PIX5LB, and PIX6LB may be detected from the first row.

Unlike the embodiment illustrated in FIG. 6A, in the embodiment illustrated in FIG. 6B, when the first readout operation is performed on the second row, the transfer gate signal TGAR may be enabled at the same time with the transfer gate signal TGL. In such an embodiment, the transfer gate signal TGAR may be called a "transfer gate signal TGAL", unlike the example illustrated in FIG. 6B. Accordingly, when the first readout operation is performed on the second row, the floating diffusion areas FD3, FD4, FD7, and FD8 of the second row may be reset, and the transfer gate signals TGL and TGAR may first be enabled. As such, pixel voltages corresponding to the sub-pixels PIX3LB, PIX4LB, PIX7RB, and PIX8RB may be detected from the second row. Consequently, pixel voltages (e.g., voltages of the sub-pixels PIX7RB and PIX8RB) that utilize a longer time in processing of the image processor 10 may start to be processed by the image processor 10 first. Subsequently, the transfer gate signal TGR may be enabled. As such, pixel voltages corresponding to the sub-pixels PIX3RB, PIX4RB, PIX7LB, and PIX8LB may be detected from the second row. The image processor 10 may perform auto focus processing by processing image data that are based on the detected pixel voltages.

When the second readout operation is performed on the first row, all of the floating diffusion areas FD1, FD2, FD5, and FD6 of the first row may be reset, and only the transfer gate signals TGL and TGR may be enabled. Subsequently, when the second readout operation is performed on the second row, all of the floating diffusion areas FD3, FD4, FD7, and FD8 of the second row may be reset, and only the transfer gate signals TGL and TGR may be simultaneously enabled. For example, the image processor 10 may perform auto focus processing based on the pixel voltages, which correspond to the sub-pixels PIX2RB and PIX7LB, from among sum voltages corresponding to the sub-pixels PIX1LB, PIX1RB, PIX3LB, PIX3RB, PIX4LB, PIX4RB, PIX5LB, PIX5RB, PIX6LB, PIX6RB, PIX8LB, and PIX8RB and pixel voltages corresponding to the sub-pixels PIX2RB and PIX7LB and may perform image processing based on pixel voltages corresponding to the remaining sub-pixels PIX1LB, PIX1RB, PIX3LB, PIX3RB, PIX4LB, PIX4RB, PIX5LB, PIX5RB, PIX6LB, PIX6RB, PIX8LB, and PIX8RB.

Differences between the embodiment illustrated in FIG. 6A and the embodiment illustrated in FIG. 6C will be described with reference to FIGS. 1, 4, 6A, and 6C. In the embodiment illustrated in FIG. 6C, the pixel group PIXGR1C and the pixel group PIXGR2C may be disposed adjacent to each other. As in the pixel group PIXGR1A and the pixel group PIXGR2A, each of the pixel group PIXGR1C and the pixel group PIXGR2C may include four pixels, each of which may include two sub-pixels. Unlike the embodiment illustrated in FIG. 6A, in an embodiment according to FIG. 6C, some sub-pixels do not include a photoelectric conversion element and instead, may be connected to a local ground voltage.

For example, configurations and operations of pixels PIX1C, PIX3C, and PIX4C included in the pixel group PIXGR1C may be implemented to be similar to the pixels PIX1A, PIX3A, and PIX4A included in the pixel group PIXGR1A. However, unlike the sub-pixel PIX2LA of the pixel PIX2A, in an embodiment, a sub-pixel PIX2LC of the pixel PIX2C does not include a photodiode. Instead, a transfer transistor T2LC of the sub-pixel PIX2LC may be connected to a ground voltage. In some embodiments, unlike the embodiment illustrated in FIG. 6C, the sub-pixel PIX2LC does not include the transfer transistor T2LC, and instead, a ground node may be disposed. In embodiments, transfer transistors of sub-pixels may be directly connected to a ground node.

The pixel PIX1C includes sub-pixels PIX1LC and PIX1RC, which include transfer transistor T1LC and T1RC. The pixel PIX2C includes the sub-pixel PIX2LC and sub-pixel PIX2RC, which include transfer transistors T2LC and T2RC. The pixel PIX3C includes sub-pixels PIX3LC and PIX3RC, which include transfer transistors T3LC and T3RC. The pixel PIX4C includes sub-pixels PIX4LC and PIX4RC, which include transfer transistors T4LC and T4RC.

Configurations and operations of pixels PIX5C, PIX6C, and PIX8C included in the pixel group PIXGR2C may be implemented to be similar to the pixels PIX5A, PIX6A, and PIX8A included in the pixel group PIXGR2A. However, unlike the sub-pixel PIX7RA of the pixel PIX7A, in an embodiment, a sub-pixel PIX7RC of the pixel PIX7C does not include a photodiode. A configuration and an operation of the sub-pixel PIX7RC may be implemented to be similar to those of the sub-pixel PIX2LC.

The pixel PIX5C includes sub-pixels PIX5LC and PIX5RC, which include transfer transistor T5LC and T5RC. The pixel PIX6C includes sub-pixels PIX6LC and PIX6RC, which include transfer transistors T6LC and T6RC. The pixel PIX7C includes sub-pixels PIX7LC and PIX7RC, which include transfer transistors T7LC and T7RC. The pixel PIX8C includes sub-pixels PIX8LC and PIX8RC, which include transfer transistors T8LC and T8RC.

Figure 7A:
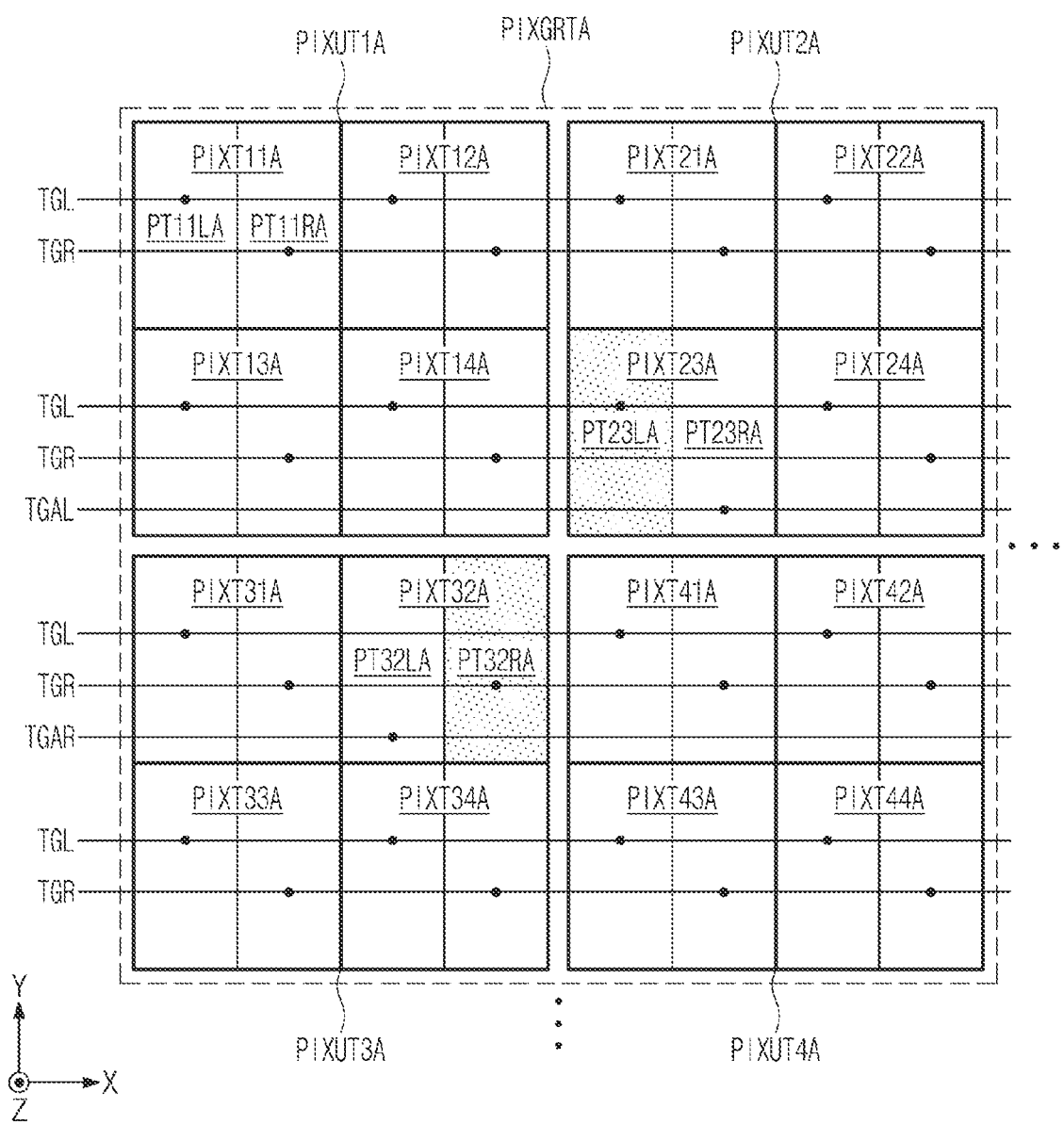
FIGS. 7A and 7B illustrate pixel groups repeatedly disposed in a pixel array in more detail, according to some embodiments of the present disclosure.
Figure 7B:
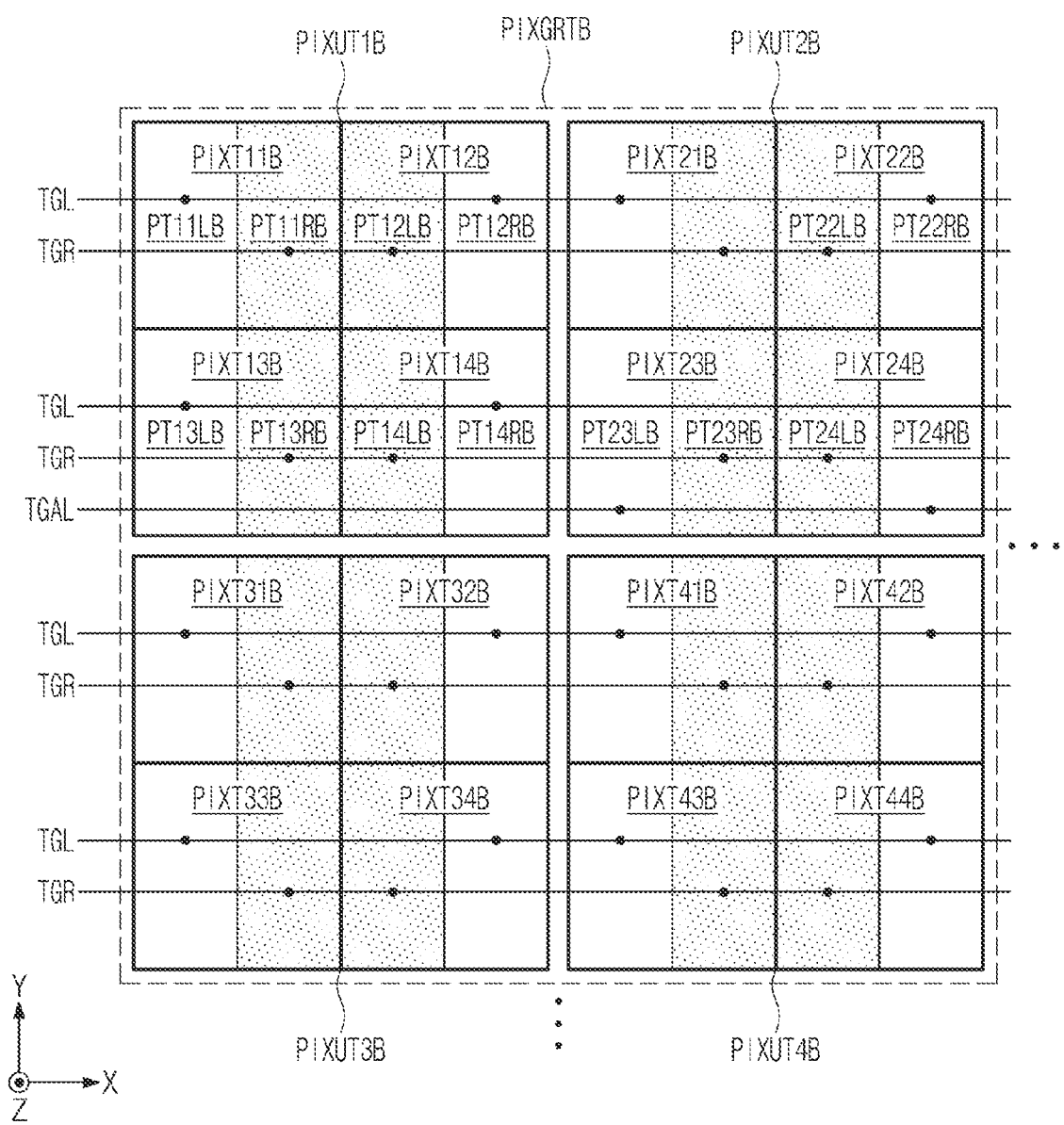

FIGS. 7A and 7B illustrate pixel groups PIXGRTA and PIXGRTB repeatedly disposed in the pixel array 110 in more detail, according to some embodiments of the present disclosure.

Unlike the embodiments illustrated in FIGS. 6A to 6C, each of the pixel group PIXGRTA of FIG. 7A and the pixel group PIXGRTB of FIG. 7B may include four unit pixel groups, each of which may include four pixels. Each pixel may include two sub-pixels. For example, the pixel group PIXGRTA may include four unit pixel groups PIXUT1A, PIXUT2A, PIXUT3A, and PIXUT4A. The unit pixel group PIXUT1A may include four pixels PIXT11A, PIXT12A, PIXT13A, and PIXT14A. The pixel PIXT11A may include two sub-pixels PT11LA and PT11RA.

In some embodiments, as in the first pixel group PIXGR1 of FIG. 2, a first unit color filter array including green (G), red (R), green (G), and blue (B) color filters sequentially arranged clockwise from an upper left end thereof may be located on each of the unit pixel groups PIXUT1A, PIXUT2A, PIXUT3A, and PIXUT4A.

In the embodiment illustrated in FIG. 7A, each of the pixels PIXT11A, PIXT12A, PIXT13A, PIXT14A, PIXT21A, PIXT22A, PIXT24A, PIXT31A, PIXT33A, PIXT34A, PIXT41A, PIXT42A, PIXT43A, and PIXT44A may include a sub-pixel receiving the transfer gate signal TGL and a sub-pixel receiving the transfer gate signal TGR. However, the pixel PIXT23A may include a sub-pixel receiving the transfer gate signal TGAL, and the pixel PIXT32A may include a sub-pixel receiving the transfer gate signal TGAR. In more detail, a sub-pixel PT23LA of the pixel PIXT23A may include a transfer transistor receiving the transfer gate signal TGL, and a sub-pixel PT23RA of the pixel PIXT23A may include a transfer transistor receiving the transfer gate signal TGAL. A sub-pixel PT32LA of the pixel PIXT32A may include a transfer transistor receiving the transfer gate signal TGAR, and a sub-pixel PT32RA of the pixel PIXT32A may include a transfer transistor receiving the transfer gate signal TGR.

In the embodiment illustrated in FIG. 7A, when the first readout operation is performed for each row of the pixel group PIXGRTA, all floating diffusion areas of each row may first be reset, and the transfer gate signals TGL and TGAL may be enabled (or in some rows where there is no connection with a transmission metal line to which the transfer gate signal TGAL is applied, only the transfer gate signal TGL may be enabled). Subsequently, the transfer gate signals TGR and TGAR may be enabled (or in some rows where there is no connection with a transmission metal line to which the transfer gate signal TGAR is applied, only the transfer gate signal TGR may be enabled). The image processor 10 may process image data based on pixel voltages detected from the pixel group PIXGRTA.

When the second readout operation is performed for each row of the pixel group PIXGRTA, all the floating diffusion areas of each row may first be reset, and only the transfer gate signals TGL and TGR may be enabled. For example, the image processor 10 may perform auto focus processing based on pixel voltages corresponding to the sub-pixels PT23LA and PT32RA from among the pixel voltages detected from the pixel group PIXGRTA and may perform image processing based on sum pixel voltages of the remaining sub-pixels. For example, the image processor 10 may correct image data corresponding to the sub-pixels PT23LA, PT23RA, PT32LA, and PT32RA.

In some embodiments, as in the embodiment illustrated in FIG. 6A, the image sensor 100 may further include the binning circuit. The image sensor 100 may output image data corresponding to one pixel (e.g., the pixel PIXT11A) by performing binning on voltages respectively obtained from sub-pixels (e.g., the sub-pixels PT11LA and PT11RA) included in the one pixel (e.g., the pixel PIXT11A). The image sensor 100 may output image data corresponding to one unit pixel group (e.g., the unit pixel group PIXUT1A) by performing binning on voltages (or on voltages respectively obtained from sub-pixels of the four pixels) respectively obtained from four pixels (e.g., the pixels PIXT11A, PIXT12A, PIXT13A, and PIXT14A) included in the one unit pixel group (e.g., the unit pixel group PIXUT1A).

Differences between the embodiment illustrated in FIG. 7A and the embodiment illustrated in FIG. 7B will be described with reference to FIGS. 1, 7A, and 7B. In the embodiment illustrated in FIG. 7B, each of the pixels PIXT11B, PIXT12B, PIXT13B, PIXT14B, PIXT21B, PIXT22B, PIXT31B, PIXT32B, PIXT33B, PIXT34B, PIXT41B, PIXT42B, PIXT43B, and PIXT44B may include a sub-pixel receiving the transfer gate signal TGL and a sub-pixel receiving the transfer gate signal TGR. However, each of the pixel PIXT23B and the pixel PIXT24B may include a sub-pixel receiving the transfer gate signal TGAL. In more detail, a sub-pixel PT23LB of the pixel PIXT23B may include a transfer transistor receiving the transfer gate signal TGAL, and a sub-pixel PT23RB of the pixel PIXT23B may include a transfer transistor receiving the transfer gate signal TGR. A sub-pixel PT24LB of the pixel PIXT24B may include a transfer transistor receiving the transfer gate signal TGR, and a sub-pixel PT24RB of the pixel PIXT24B may include a transfer transistor receiving the transfer gate signal TGAL. The pixel PIXT11B may include sub-pixels PT11LB and PT11RB, the pixel PIXT13B may include sub-pixels PT13LB and PT13RB, and the pixel PIXT22B may include the sub-pixels PT22LB and PT22RB In the embodiment illustrated in FIG. 7B, when the first readout operation is performed for each row of the pixel group PIXGRTB, all floating diffusion areas of each row may first be reset, and the transfer gate signals TGL and TGAL may be enabled (or in some rows where there is no connection with a transmission metal line to which the transfer gate signal TGAL is applied, only the transfer gate signal TGL may be enabled). Subsequently, the transfer gate signal TGR may be enabled. As such, pixel signals for which a relatively longer time is utilized in signal processing may first be transmitted to the image processor 10. For example, in the unit pixel group PIXUT1B among the unit pixel groups PIXUT1B, PIXUT2B, PIXUT3B, and PIXUT4B, pixel signals corresponding to the sub-pixels PT12RB and PT14RB for which a longer time in signal processing is utilized may be transmitted to the image processor 10 prior to pixel signals corresponding to the sub-pixels PT12LB and PT14LB. As a result, a total of time necessary for auto focus processing may decrease. The image processor 10 may process image data based on the detected pixel voltages.

When the second readout operation is performed for each row of the pixel group PIXGRTB, all of the floating diffusion areas of each row may first be reset, and only the transfer gate signals TGL and TGR may be enabled. The image processor 10 may perform auto focus processing based on pixel voltages corresponding to the sub-pixels PT23RB and PT24LB from among the pixel voltages detected from the pixel group PIXGRTB and may perform image processing based on sum pixel voltages of the remaining sub-pixels. For example, the image processor 10 may correct image data corresponding to the sub-pixels PT23LB, PT23RB, PT24LB, and PT24RB. In the embodiment illustrated in FIG. 7B, because the sub-pixels PT23RB and PT24LB are disposed in the same row, a time taken to detect pixel voltages for auto focus processing may be shortened.

Figure 8A:
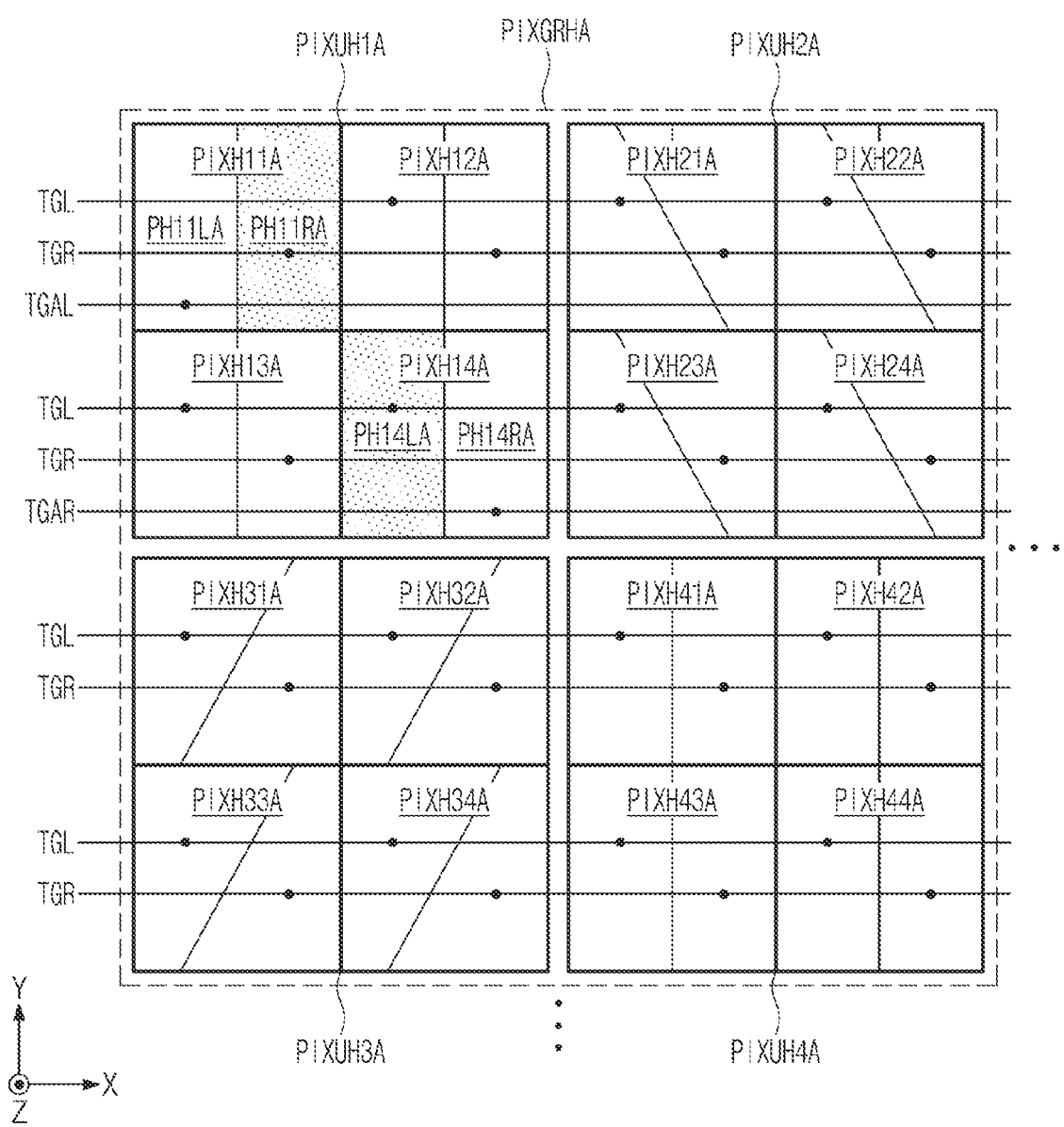
FIGS. 8A and 8B illustrate pixel groups repeatedly disposed in a pixel array in more detail, according to some embodiments of the present disclosure.
Figure 8B:
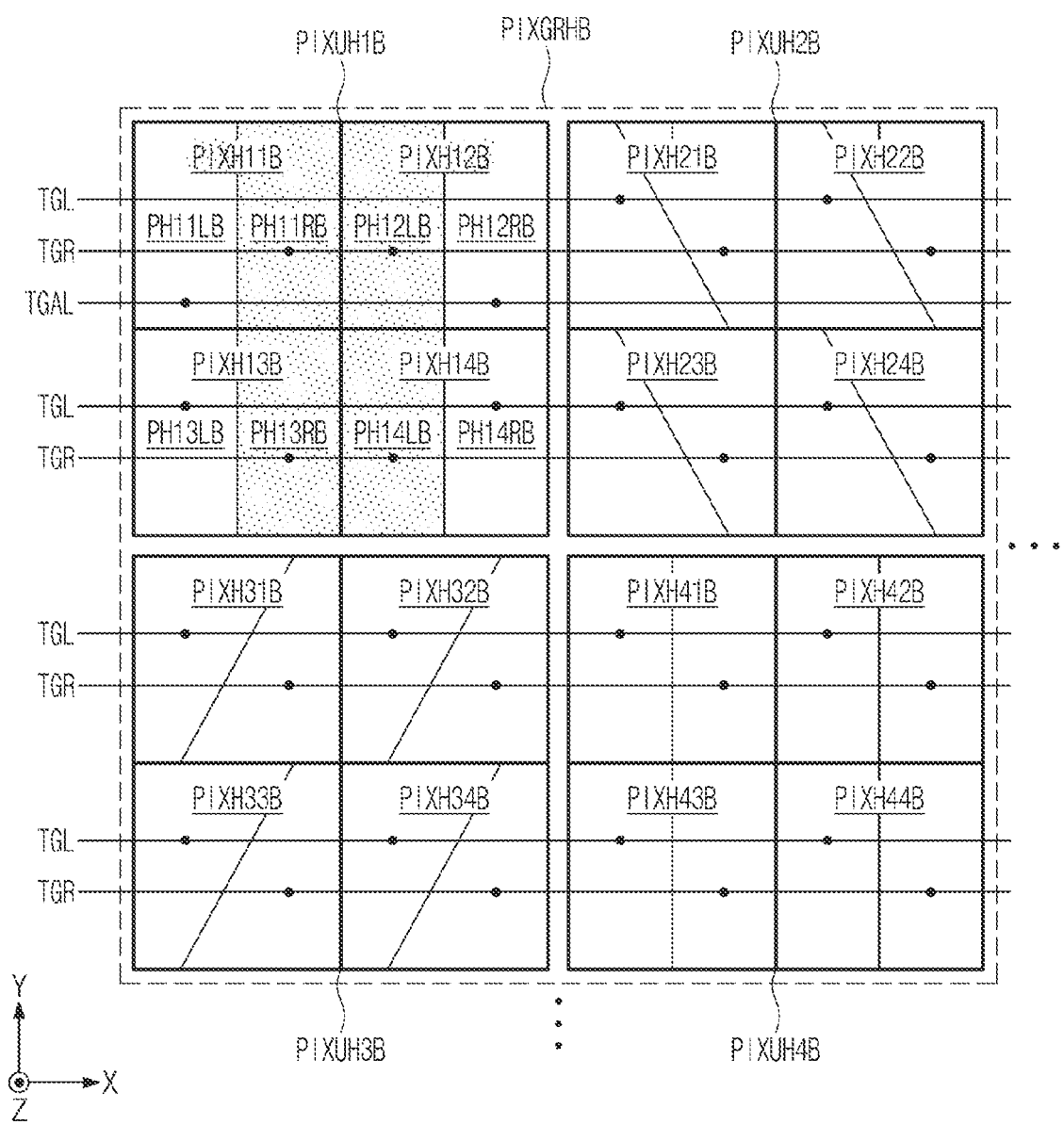

FIGS. 8A and 8B illustrate pixel groups PIXGRHA and PIXGRHB repeatedly disposed in the pixel array 110 in more detail, according to some embodiments of the present disclosure.

As in the pixel group PIXGRTA of FIG. 7A and the pixel group PIXGRTB of FIG. 7B, each of the pixel group PIXGRHA of FIG. 8A and the pixel group PIXGRHB of FIG. 8B may include four unit pixel groups, each of which may include four pixels. Each pixel may include two sub-pixels. Unlike the embodiments illustrated in FIGS. 7A and 7B, in the embodiment illustrated in FIG. 8A, some pixels may include two sub-pixels that are isolated by a boundary in a diagonal direction, and not the column direction (e.g., the Y-axis direction). For example, a pixel PIXH21A of a unit pixel group PIXUH2A may include a pair of sub-pixels isolated by a boundary in a first diagonal direction. A pixel PIXH31A of a unit pixel group PIXUH3A may include a pair of sub-pixels isolated by a boundary in a second diagonal direction.

In some embodiments, as in the first pixel group PIXGR1 of FIG. 2, a first unit color filter array including green (G), red (R), green (G), and blue (B) color filters sequentially arranged clockwise from an upper left end thereof may be located on each of the unit pixel groups PIXUH1A, PIXUH2A, PIXUH3A, and PIXUH4A.

In the embodiment illustrated in FIG. 8A, each of pixels PIXH12A, PIXH13A, PIXH21A, PIXH22A, PIXH23A, PIXH24A, PIXH31A, PIXH32A, PIXH33A, PIXH34A, PIXH41A, PIXH42A, PIXH43A, and PIXH44A may include a sub-pixel receiving the transfer gate signal TGL and a sub-pixel receiving the transfer gate signal TGR. However, a pixel PIXH11A may include a sub-pixel receiving the transfer gate signal TGAL, and the pixel PIXH14A may include a sub-pixel receiving the transfer gate signal TGAR. In more detail, a sub-pixel PH11LA of the pixel PIXH11A may include a transfer transistor receiving the transfer gate signal TGAL, and a sub-pixel PH11RA of the pixel PIXH11A may include a transfer transistor receiving the transfer gate signal TGR. A sub-pixel PH14LA of the pixel PIXH14A may include a transfer transistor receiving the transfer gate signal TGL, and a sub-pixel PH14RA of the pixel PIXH14A may include a transfer transistor receiving the transfer gate signal TGAR.

In the embodiment illustrated in FIG. 8A, when the first readout operation is performed for each row of the pixel group PIXGRHA, all floating diffusion areas of each row may first be reset, and the transfer gate signals TGL and TGAL may be enabled (or in some rows where there is no connection with a transmission metal line to which the transfer gate signal TGAL is applied, only the transfer gate signal TGL may be enabled). Subsequently, the transfer gate signals TGR and TGAR may be enabled (or in some rows where there is no connection with a transmission metal line to which the transfer gate signal TGAR is applied, only the transfer gate signal TGR may be enabled), and the image processor 10 may process image data based on detected pixel voltages.

When the second readout operation is performed for each row of the pixel group PIXGRHA, all of the floating diffusion areas of each row may first be reset, and only the transfer gate signals TGL and TGR may be enabled. The image processor 10 may perform auto focus processing based on pixel voltages corresponding to sub-pixels PH11RA and PH14LA from among pixel voltages detected from the pixel group PIXGRHA and may perform image processing based on sum pixel voltages of the remaining sub-pixels. For example, the image processor 10 may correct image data corresponding to the sub-pixels PH11LA, PH11RA, PH14LA, and PH14RA.

In some embodiments, as in the embodiment illustrated in FIG. 7A, the image sensor 100 may further include the binning circuit. The image sensor 100 may generate a binning signal corresponding to one pixel by performing binning on two pixel voltages obtained from sub-pixels included in the one pixel. The image sensor 100 may generate a binning signal corresponding to one unit pixel group by performing binning on eight pixel voltages obtained from sub-pixels included in the one unit pixel group.

Differences between the embodiment illustrated in FIG. 8A and the embodiment illustrated in FIG. 8B will be described with reference to FIGS. 1, 8A, and 8B. In the embodiment illustrated in FIG. 8B, each of pixels PIXH13B, PIXH14B, PIXH21B, PIXH22B, PIXH23B, PIXH24B, PIXH31B, PIXH32B, PIXH33B, PIXH34B, PIXH41B, PIXH42B, PIXH43B, and PIXH44B may include a sub-pixel receiving the transfer gate signal TGL and a sub-pixel receiving the transfer gate signal TGR. However, each of the pixel PIXH11B and the pixel PIXH12B may include a sub-pixel receiving the transfer gate signal TGAL. In more detail, a sub-pixel PH11LB of the pixel PIXH11B may include a transfer transistor receiving the transfer gate signal TGAL, and a sub-pixel PH11RB of the pixel PIXH11B may include a transfer transistor receiving the transfer gate signal TGR. A sub-pixel PH12LB of the pixel PIXH12B may include a transfer transistor receiving the transfer gate signal TGR, and a sub-pixel PH12RB of the pixel PIXH12B may include a transfer transistor receiving the transfer gate signal TGAL.

In the embodiment illustrated in FIG. 8B, when the first readout operation is performed for each row of the pixel group PIXGRHB, all floating diffusion areas of each row may first be reset, and the transfer gate signals TGL and TGAL may be enabled (or in some rows where there is no connection with a transmission metal line to which the transfer gate signal TGAL is applied, only the transfer gate signal TGL may be enabled). Subsequently, the transfer gate signals TGR and TGAR may be enabled (or in some rows where there is no connection with a transmission metal line to which the transfer gate signal TGAR is applied, only the transfer gate signal TGR may be enabled). As such, pixel signals for which a relatively longer time is utilized in signal processing may first be transmitted to the image processor 10. For example, in the unit pixel group PIXUH1B, pixel signals corresponding to the sub-pixels PH12RB and PH14RB that utilize a longer time in signal processing may be transmitted to the image processor 10 prior to pixel signals corresponding to the sub-pixels PH12LB and PH14LB. As a result, a total amount of time necessary for auto focus processing may decrease. The image processor 10 may process image data based on the detected pixel voltages.

When the second readout operation is performed for each row of the pixel group PIXGRHA, all of the floating diffusion areas of each row may first be reset, and only the transfer gate signals TGL and TGR may be enabled. The image processor 10 may perform auto focus processing based on pixel voltages corresponding to sub-pixels PH11RB and PH12LB from among pixel voltages detected from the pixel group PIXGRHB and may perform image processing based on sum pixel voltages of the remaining sub-pixels. For example, the image processor 10 may correct image data corresponding to the sub-pixels PH11LB, PH11RB, PH12LB, and PH12RB.

FIG. 8B also illustrates unit pixel groups PIXUH2B, PIXUH3B, and PIXUH4B, and sub-pixels PH13LB and PH13RB.

Figure 9:
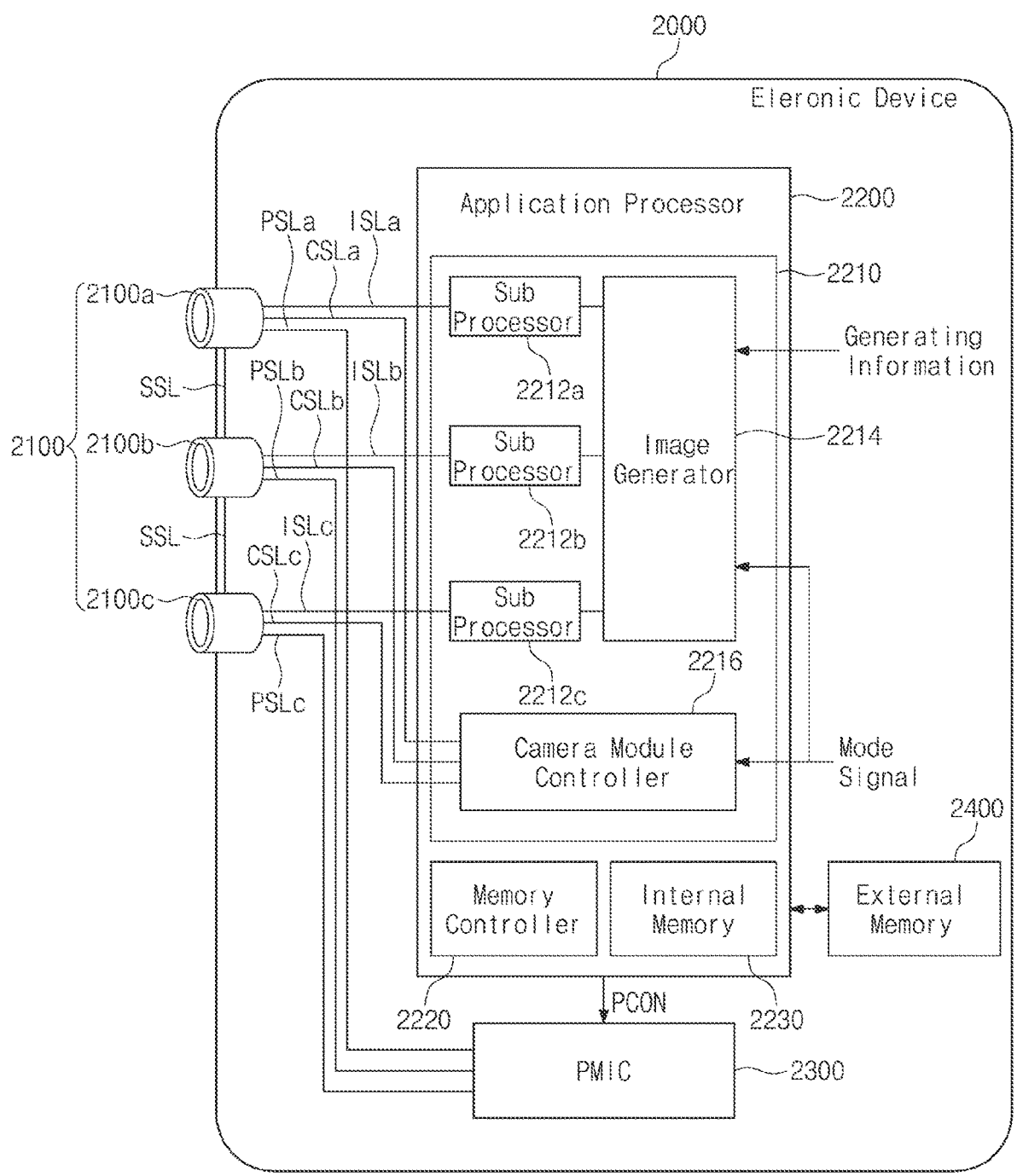
FIG. 9 is a block diagram of an electronic device including a multi-camera module according to an embodiment of the present disclosure.

FIG. 9 is a block diagram of an electronic device including a multi-camera module according to an embodiment of the present disclosure.

Referring to FIG. 9, an electronic device 2000 may include a camera module group 2100, an application processor 2200, a power management integrated circuit (PMIC) 2300, and an external memory 2400.

The camera module group 2100 may include a plurality of camera modules 2100a, 2100b, and 2100c. Although an embodiment in which three camera modules 2100a, 2100b, and 2100c are disposed is illustrated in FIG. 9, embodiments of the present disclosure are not limited thereto. For example, in some embodiments, the camera module group 2100 may be modified to include only two camera modules. Also, in some embodiments, the camera module group 2100 may be modified to include "n" camera modules (n being a natural number of 4 or more).

Figure 10:
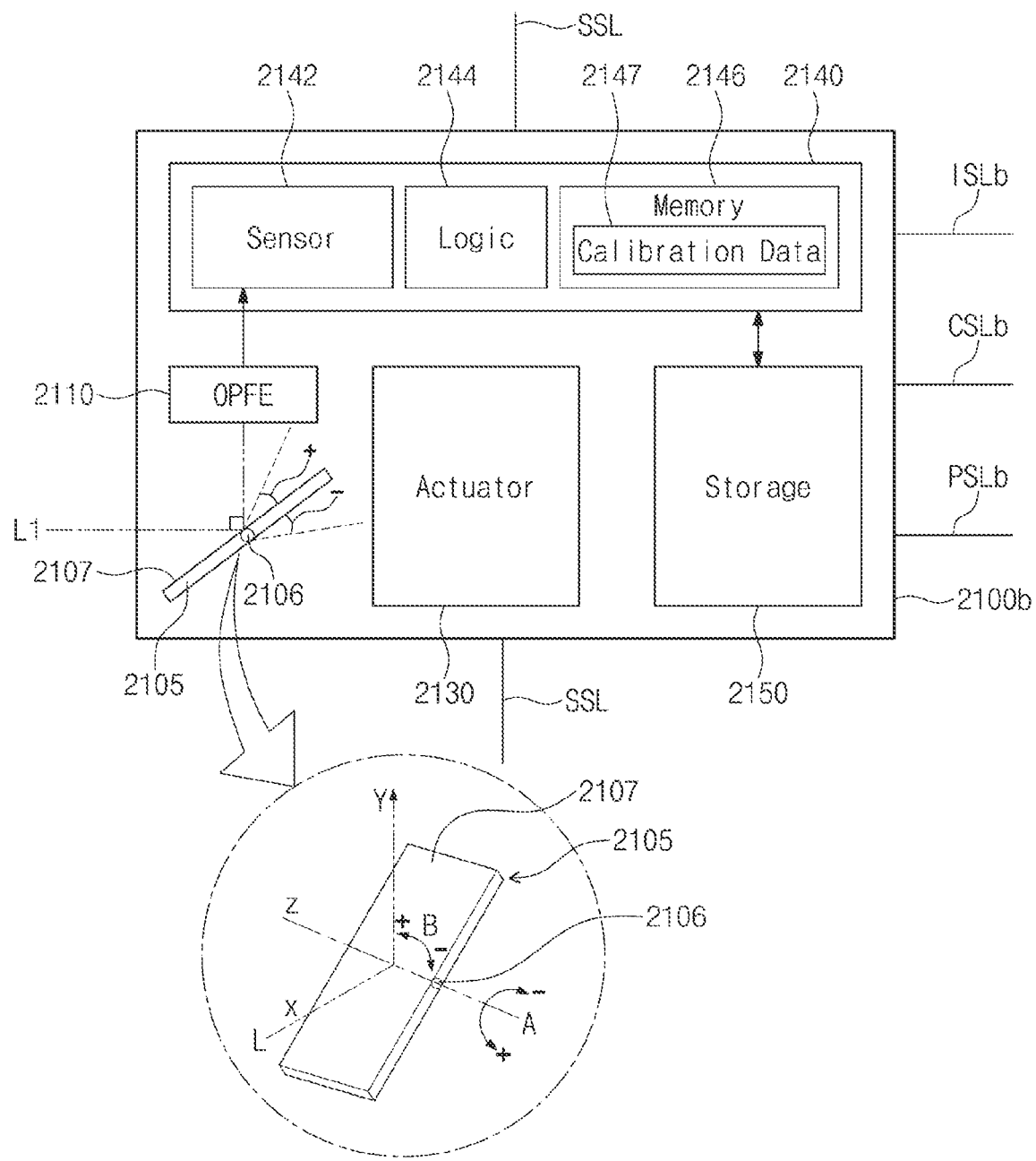
FIG. 10 is a block diagram illustrating a camera module of FIG. 9 in more detail, according to an embodiment of the present disclosure.

FIG. 10 is a detailed block diagram of a camera module of FIG. 9 in more detail, according to an embodiment of the present disclosure. Below, a detailed configuration of the camera module 2100b will be more fully described with reference to FIG. 10, and it is to be understood that the following description may be equally applied to the remaining camera modules 2100a and 2100c.

Referring to FIG. 10, the camera module 2100b may include a prism 2105, an optical path folding element (OPFE) 2110, an actuator 2130, an image sensing device 2140, and a storage unit 2150.

The prism 2105 may include a reflecting plane 2107 of a light reflecting material and may change a path of a light "L" incident from outside the camera module 2100b.

In some embodiments, the prism 2105 may change a path of the light "L" incident in a first direction "X" to a second direction "Y" perpendicular to the first direction "X". Also, the prism 2105 may change the path of the light "L" incident in the first direction "X" to the second direction "Y" perpendicular to the first direction "X" by rotating the reflecting plane 2107 of the light reflecting material in direction "A" about a central axis 2106 or rotating the central axis 2106 in direction "B". In this case, the OPFE 2110 may move in a third direction "Z" perpendicular to the first direction "X" and the second direction "Y".

In some embodiments, as illustrated, a maximum rotation angle of the prism 2105 in direction "A" may be equal to or smaller than about 15 degrees in a positive A direction and may be greater than about 15 degrees in a negative A direction. However, embodiments are not limited thereto.

In some embodiments, the prism 2105 may move within about 20 degrees in a positive or negative B direction, between about 10 degrees and about 20 degrees, or between about 15 degrees and about 20 degrees. Here, the prism 2105 may move at the same angle in the positive or negative B direction or may move at a similar angle within about, for example, 1 degree.

In some embodiments, the prism 2105 may move the reflecting plane 2107 of the light reflecting material in the third direction (e.g., a Z direction) parallel to a direction in which the central axis 2106 extends.

The OPFE 2110 may include, for example, optical lenses composed of "m" groups (m being a natural number). Here, "m" lens may move in the second direction "Y" to change an optical zoom ratio of the camera module 2100b. For example, when a default optical zoom ratio of the camera module 2100b is "Z", the optical zoom ratio of the camera module 2100b may be changed to an optical zoom ratio of 3Z, 5Z, or more than 5Z by moving "m" optical lens included in the OPFE 2110.

The actuator 2130 may move the OPFE 2110 or an optical lens (hereinafter referred to as an "optical lens") to a specific location. For example, the actuator 2130 may adjust a location of an optical lens such that an image sensor 2142 is placed at a focal length of the optical lens for accurate sensing.

The image sensing device 2140 may include the image sensor 2142, control logic 2144, and a memory 2146. The image sensor 2142 may sense an image of a sensing target by using the light "L" provided through an optical lens. In some embodiments, a configuration and an operation of the image sensor 2142 may be implemented to be similar to those of the image sensor 100 of FIG. 1. For example, the image sensor 2142 may include a pixel group that is substantially the same as or similar to one of pixel groups illustrated in FIGS. 6A to 6C, 7A, 7B, 8A, and 8B. The control logic 2144 may control overall operations of the camera module 2100b. For example, the control logic 2144 may control an operation of the camera module 2100b based on a control signal provided through a control signal line CSLb.

The memory 2146 may store information used for an operation of the camera module 2100b such as, for example, calibration data 2147. The calibration data 2147 may include information utilized for the camera module 2100b to generate image data by using the light "L" provided from outside of the camera module 2100b. The calibration data 2147 may include, for example, information about the degree of rotation described above, information about a focal length, information about an optical axis, etc. In the case where the camera module 2100b is implemented in the form of a multi-state camera in which a focal length varies depending on a location of an optical lens, the calibration data 2147 may include a focal length value for each location (or state) of the optical lens and information about auto focusing.

The storage unit 2150 may store image data sensed through the image sensor 2142. The storage unit 2150 may be disposed outside the image sensing device 2140 and may be implemented in a shape where the storage unit 2150 and a sensor chip constituting the image sensing device 2140 are stacked. In some embodiments, the storage unit 2150 may be implemented with an electrically erasable programmable read only memory (EEPROM). However, embodiments are not limited thereto.

Referring to FIGS. 9 and 10 together, in some embodiments, each of the plurality of camera modules 2100a, 2100b, and 2100c may include the actuator 2130. As such, the same calibration data 2147 or different calibration data 2147 may be included in the plurality of camera modules 2100a, 2100b, and 2100c depending on operations of the actuators 2130 therein.

In some embodiments, one camera module (e.g., 2100b) among the plurality of camera modules 2100a, 2100b, and 2100c may be a folded lens shape of camera module in which the prism 2105 and the OPFE 2110 described above are included, and the remaining camera modules (e.g., 2100a and 2100c) may be a vertical shape of camera module in which the prism 2105 and the OPFE 2110 described above are not included. However, embodiments are not limited thereto.

In some embodiments, one camera module (e.g., 2100c) among the plurality of camera modules 2100a, 2100b, and 2100c may be, for example, a vertical shape of depth camera extracting depth information by using an infrared (IR) ray. In this case, the application processor 2200 may merge image data provided from the depth camera and image data provided from any other camera module (e.g., 2100a or 2100b) and may generate a three-dimensional (3D) depth image.

In some embodiments, at least two camera modules (e.g., 2100a and 2100b) among the plurality of camera modules 2100a, 2100b, and 2100c may have different fields of view. In this case, the at least two camera modules (e.g., 2100a and 2100b) among the plurality of camera modules 2100a, 2100b, and 2100c may include different optical lens. However, embodiments are not limited thereto.

Also, in some embodiments, fields of view of the plurality of camera modules 2100a, 2100b, and 2100c may be different. In this case, the plurality of camera modules 2100a, 2100b, and 2100c may include different optical lens. However, embodiments are not limited thereto.

In some embodiments, the plurality of camera modules 2100a, 2100b, and 2100c may be physically separated from each other. That is, in some embodiments, the plurality of camera modules 2100a, 2100b, and 2100c do not use a sensing area of one image sensor 2142, but rather, the plurality of camera modules 2100a, 2100b, and 2100c may include independent image sensors 2142 therein, respectively.

Referring back to FIG. 9, the application processor 2200 may include an image processing device 2210, a memory controller 2220, and an internal memory 2230. The application processor 2200 may be implemented to be separated from the plurality of camera modules 2100a, 2100b, and 2100c. For example, the application processor 2200 and the plurality of camera modules 2100a, 2100b, and 2100c may be implemented with separate semiconductor chips.

The image processing device 2210 may include a plurality of sub image processors 2212a, 2212b, and 2212c, an image generator 2214, and a camera module controller 2216.

The image processing device 2210 may include the plurality of sub image processors 2212a, 2212b, and 2212c, the number of which corresponds to the number of the plurality of camera modules 2100a, 2100b, and 2100c.

Image data respectively generated from the camera modules 2100a, 2100b, and 2100c may be respectively provided to the corresponding sub image processors 2212a, 2212b, and 2212c through separate image signal lines ISLa, ISLb, and ISLc. For example, the image data generated from the camera module 2100a may be provided to the sub image processor 2212a through the image signal line ISLa, the image data generated from the camera module 2100b may be provided to the sub image processor 2212b through the image signal line ISLb, and the image data generated from the camera module 2100c may be provided to the sub image processor 2212c through the image signal line ISLc. This image data transmission may be performed, for example, by using a camera serial interface (CSI) based on the Mobile Industry Processor Interface (MIPI). However, embodiments are not limited thereto.

In some embodiments, one sub image processor may be disposed to correspond to a plurality of camera modules. For example, the sub image processor 2212a and the sub image processor 2212c may be integrally implemented, instead of being separated from each other as illustrated in FIG. 9. In this case, one of the pieces of image data respectively provided from the camera module 2100a and the camera module 2100c may be selected through a selection element (e.g., a multiplexer), and the selected image data may be provided to the integrated sub image processor.

The image data respectively provided to the sub image processors 2212a, 2212b, and 2212c may be provided to the image generator 2214. The image generator 2214 may generate an output image by using the image data respectively provided from the sub image processors 2212a, 2212b, and 2212c, depending on image generating information ("Generating Information" in FIG. 9) or a mode signal.

For example, the image generator 2214 may generate the output image by merging at least a portion of the image data respectively generated from the camera modules 2100a, 2100b, and 2100c having different fields of view, depending on the image generating information Generating Information or the mode signal. Also, the image generator 2214 may generate the output image by selecting one of the image data respectively generated from the camera modules 2100a, 2100b, and 2100c having different fields of view, depending on the image generating information Generating Information or the mode signal.

In some embodiments, the image generating information Generating Information may include a zoom signal or a zoom factor. Also, in some embodiments, the mode signal may be, for example, a signal based on a mode selected from a user.

In the case where the image generating information Generating Information is the zoom signal (or zoom factor) and the camera modules 2100a, 2100b, and 2100c have different visual fields (or fields of view), the image generator 2214 may perform different operations depending on a kind of the zoom signal. For example, in the case where the zoom signal is a first signal, the image generator 2214 may merge the image data output from the camera module 2100a and the image data output from the camera module 2100c, and may generate the output image by using the merged image signal and the image data output from the camera module 2100b that is not used in the merging operation. In the case where the zoom signal is a second signal different from the first signal, without the image data merging operation, the image generator 2214 may select one of the image data respectively output from the camera modules 2100a, 2100b, and 2100c and may output the selected image data as the output image. However, embodiments are not limited thereto.

In some embodiments, the image generator 2214 may generate merged image data having an increased dynamic range by receiving a plurality of image data of different exposure times from at least one of the plurality of sub image processors 2212a, 2212b, and 2212c and performing high dynamic range (HDR) processing on the plurality of image data.

The camera module controller 2216 may provide control signals to the camera modules 2100a, 2100b, and 2100c, respectively. The control signals generated from the camera module controller 2216 may be respectively provided to the corresponding camera modules 2100a, 2100b, and 2100c through control signal lines CSLa, CSLb, and CSLc, which are separated from each other.

One of the plurality of camera modules 2100a, 2100b, and 2100c may be designated as a master camera (e.g., 2100b) depending on the image generating information Generating Information including a zoom signal or the mode signal, and the remaining camera modules (e.g., 2100a and 2100c) may each be designated as a slave camera. The above designation information may be included in the control signals, and the control signals including the designation information may be respectively provided to the corresponding camera modules 2100a, 2100b, and 2100c through the control signal lines CSLa, CSLb, and CSLc, which are separated from each other.

Camera modules operating as a master and a slave may be changed depending on the zoom factor or an operating mode signal. For example, in the case where the field of view of the camera module 2100a is wider than the field of view of the camera module 2100b and the zoom factor indicates a low zoom ratio, the camera module 2100b may operate as a master, and the camera module 2100a may operate as a slave. In contrast, in the case where the zoom factor indicates a high zoom ratio, the camera module 2100a may operate as a master, and the camera module 2100b may operate as a slave.

In some embodiments, the control signal provided from the camera module controller 2216 to each of the camera modules 2100a, 2100b, and 2100c may include a sync enable signal. For example, in the case where the camera module 2100b is used as a master camera and the camera modules 2100a and 2100c are used as a slave camera, the camera module controller 2216 may transmit the sync enable signal to the camera module 2100b. The camera module 2100b that is provided with the sync enable signal may generate a sync signal based on the provided sync enable signal and may provide the generated sync signal to the camera modules 2100a and 2100c through a sync signal line SSL. The camera module 2100b and the camera modules 2100a and 2100c may be synchronized with the sync signal to transmit image data to the application processor 2200.

In some embodiments, the control signal provided from the camera module controller 2216 to each of the camera modules 2100a, 2100b, and 2100c may include mode information according to the mode signal. Based on the mode information, the plurality of camera modules 2100a, 2100b, and 2100c may operate in a first operating mode and a second operating mode with regard to a sensing speed.

In the first operating mode, the plurality of camera modules 2100a, 2100b, and 2100c may generate image signals at a first speed (e.g., may generate image signals of a first frame rate), may encode the image signals at a second speed higher than the first speed (e.g., may encode the image signal of a second frame rate higher than the first frame rate), and transmit the encoded image signals to the application processor 2200. In this case, the second speed may be about 30 times or less the first speed.

The application processor 2200 may store the received image signals, that is, the encoded image signals, in the internal memory 2230 provided therein or the external memory 2400 disposed outside the application processor 2200. Subsequently, the application processor 2200 may read and decode the encoded image signals from the internal memory 2230 or the external memory 2400 and may display image data generated based on the decoded image signals. For example, the corresponding one among sub image processors 2212*a*, 2212*b*, and 2212*c* of the image processing device 2210 may perform decoding and may also perform image processing on the decoded image signal.

In the second operating mode, the plurality of camera modules 2100*a*, 2100*b*, and 2100*c* may generate image signals at a third speed (e.g., may generate image signals of a third frame rate lower than the first frame rate) and transmit the image signals to the application processor 2200. The image signals provided to the application processor 2200 may be signals that are not encoded. The application processor 2200 may perform image processing on the received image signals or may store the image signals in the internal memory 2230 or the external memory 2400.

The PMIC 2300 may supply power, for example, power supply voltages, to the plurality of camera modules 2100*a*, 2100*b*, and 2100*c*, respectively. For example, under control of the application processor 2200, the PMIC 2300 may supply a first power to the camera module 2100*a* through a power signal line PSLa, may supply a second power to the camera module 2100*b* through a power signal line PSLb, and may supply a third power to the camera module 2100*c* through a power signal line PSLc.

In response to a power control signal PCON from the application processor 2200, the PMIC 2300 may generate power corresponding to each of the plurality of camera modules 2100*a*, 2100*b*, and 2100*c* and may adjust a level of the power. The power control signal PCON may include a power adjustment signal for each operating mode of the plurality of camera modules 2100*a*, 2100*b*, and 2100*c*. For example, the operating mode may include a low-power mode. In this case, the power control signal PCON may include information about a camera module operating in the low-power mode and a set power level. Levels of the powers respectively provided to the plurality of camera modules 2100*a*, 2100*b*, and 2100*c* may be identical to each other or may be different from each other. Also, a level of power may be dynamically changed.

According to an embodiment of the present disclosure, some rows of a pixel array of an image sensor may include three transmission metal lines. Pixels may be electrically connected to two of the three transmission metal lines, and pixel voltages for computing a phase difference may be detected from the pixels in response to signals applied to the three transmission metal lines. As such, time and a power necessary to process auto focus may be reduced according to embodiments of the present disclosure.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
an image sensor which generates image data; and
an image processor which processes the image data,
wherein the image sensor comprises:
a pixel array comprising a plurality of pixels repeatedly disposed along a row direction and a column direction,
wherein the plurality of pixels comprises every pixel disposed along the row direction and the column direction,
wherein each of pixels from among the pixels belonging to a first row of a plurality of rows of the pixel array comprises a plurality of sub-pixels, the sub-pixels within a same one of the pixels belonging to the first row are disposed along the row direction relative to each other, and each sub-pixel within the same one of the pixels belonging to the first row is connected to a different one of a first transmission metal line, a second transmission metal line, and a third transmission metal line,
wherein, in response to signals respectively applied to the first to third transmission metal lines, at least a part of charges integrated at the sub-pixels of the pixels belonging to the first row is diffused to corresponding floating diffusion areas,
wherein each of pixels from among the pixels belonging to a second row of the rows of the pixel array comprises a plurality of sub-pixels, the sub-pixels within a same one of the pixels belonging to the second row are disposed along the row direction relative to each other, and each sub-pixel within the same one of the pixels belonging to the second row is connected to a different one of a fourth transmission metal line, a fifth transmission metal line, and a sixth transmission metal line,
wherein a first pixel of the pixels belonging to the first row comprises a first sub-pixel connected to the third transmission metal line and a second sub-pixel connected to the second transmission metal line,
wherein a second pixel of the pixels belonging to the second row comprises a first sub-pixel connected to the fourth transmission metal line or the fifth transmission metal line and a second sub-pixel connected to the sixth transmission metal line,
wherein the second sub-pixel of the first pixel and the first sub-pixel of the second pixel are located in different columns,
wherein the image processor performs auto focus processing based on one of a first mode and a second mode, and
wherein, in the second mode, the image processor performs the auto focus processing based on a pixel voltage corresponding to the second sub-pixel of the first pixel and a pixel voltage corresponding to the first sub-pixel of the second pixel among pixel voltages output from the first and second rows of the pixel array.

2. The electronic device of claim 1,
wherein, in the first mode, the image processor performs the auto focus processing based on pixel voltages output from the first row of the pixel array.

3. The electronic device of claim 1, wherein the image sensor:
resets floating diffusion areas of the pixels belonging to the first row;
enables a signal to be applied to the first transmission metal line and a signal to be applied to the second transmission metal line;
outputs first image data from the pixel array;
resets floating diffusion areas of the pixels belonging to the second row;

enables a signal to be applied to the fourth transmission metal line and a signal to be applied to the fifth transmission metal line; and outputs second image data from the pixel array.

4. The electronic device of claim 3, wherein the image processor performs auto focus processing based on data corresponding to the second sub-pixel of the first pixel from among the first image data and data corresponding to the second sub-pixel of the second pixel from among the second image data.

5. The electronic device of claim 1, wherein the pixels belonging to the first row of the pixel array comprise the first pixel and a third pixel, and wherein the third pixel comprises a first sub-pixel connected to the first transmission metal line and a second sub-pixel connected to the second transmission metal line.

6. The electronic device of claim 5, wherein the image sensor:

resets floating diffusion areas of the first pixel and the third pixel;

generates first image data in response to enabling a signal to be applied to the first transmission metal line and a signal to be applied to the third transmission metal line; and generates second image data in response to enabling a signal to be applied to the second transmission metal line.

7. The electronic device of claim 6, wherein the image processor performs auto focus processing based on the first image data and the second image data.

* * * * *